United States Patent [19]
Watanabe et al.

[11] Patent Number: 5,612,412
[45] Date of Patent: Mar. 18, 1997

[54] LACTONE-MODIFIED POLYVINYL ALCOHOL, A PROCESS FOR THE PREPARATION THEREOF

[75] Inventors: Kazushi Watanabe, Hiroshima-ken; Takaaki Fujiwa, Niigata-ken; Tomohisa Isobe, Yamaguchi-ken; Hiroshi Sagane, Osaka-fu, all of Japan

[73] Assignee: Daicel Chemical Industries, Ltd., Osaka, Japan

[21] Appl. No.: 476,676

[22] Filed: Jun. 7, 1995

[30] Foreign Application Priority Data

| Sep. 30, 1994 | [JP] | Japan | 6-261424 |
| Oct. 20, 1994 | [JP] | Japan | 6-281322 |
| Nov. 22, 1994 | [JP] | Japan | 6-311305 |
| Feb. 16, 1995 | [JP] | Japan | 7-051959 |
| Mar. 22, 1995 | [JP] | Japan | 7-087655 |

[51] Int. Cl.$^6$ .............................. C08L 29/04; C08F 16/06
[52] U.S. Cl. ............................. 525/58; 525/60; 525/62; 526/270
[58] Field of Search ................... 525/58, 60, 62; 526/270

[56] References Cited

U.S. PATENT DOCUMENTS

| 4,144,388 | 3/1979 | Yatsu et al. | 525/62 |
| 4,618,648 | 10/1986 | Marten | 525/60 |
| 4,871,780 | 10/1989 | Sharaby | 521/56 |
| 5,187,226 | 2/1993 | Kamach et al. | 525/60 |
| 5,190,712 | 3/1993 | Oishi et al. | 525/60 |
| 5,331,045 | 7/1994 | Spinu | 525/58 |

*Primary Examiner*—Tae Yoon
*Attorney, Agent, or Firm*—Sughrue, Mion, Zinn, Macpeak & Seas

[57] ABSTRACT

Disclosed are a lactone-modified polyvinyl alcohol and a process for the preparation thereof, a polymer composition, a permanently anti-electrostatic resin composition, a lactone-modified resin having hydroxyl groups, and a process for the preparation thereof.

The lactone-modified polyvinyl alcohol can be used in wide fields owing to capability of freely adjusting a water solubility such as water-soluble, gradually water-soluble, low water-soluble, and water-insoluble by a degree modified by lactone compounds, and owing to possessing both properties in PVA and lactones.

Furthermore, the lactone-modified polyvinyl alcohol has a property as plasticizers or softening agents, as a result, there can be provided a polymer composition having an excellent property by mixing with hydrophilic polymer or polar polymer.

Still further, a blend resin composition in which a variety of resins are blended with the lactone-modified polyvinyl alcohol has an excellent permanently-anti-electrostatic property, and the resin composition having a permanently-anti-electrostatic property can be preferably employed as a variety of molded articles such as parts for electric appliances, textiles, films, etc.

5 Claims, 5 Drawing Sheets

LACTONE-MODIFIED POLYVINYL ALCOHOL, A PROCESS FOR THE PREPARATION THEREOF

FIELD OF THE INVENTION

The present invention relates to a novel lactone-modified polyvinyl alcohol, a process for the preparation thereof, a resin composition, a permanently anti-electrostatic resin composition, a lactone-modified resin having hydroxyl groups, and a process for the preparation thereof. In the novel lactone-modified polyvinyl alcohol of the present invention, a lactone compound is introduced into the molecule by ring-opening reaction due to hydroxyl groups in a polyvinyl alcohol.

The novel lactone-modified polyvinyl alcohol provided by the present invention can be used in various fields owing to capability of freely adjusting a degree of water solubility such as water-soluble, gradually water-soluble, low water-soluble, and water-insoluble by a degree of modification by lactone compounds and by possessing properties of polyvinyl alcohol main structure combined with lactone structural units.

The novel lactone-modified polyvinyl alcohol of the present invention can be widely used as an article such as sheets and trays, pressure-sensitive adhesives, adhesives, binders for ceramics, additives for resins such as anti-static agents and anti-frosting agents, plasticizers for polar polymers, agents for giving flexibility, films for surface protection, films for wrapping, agents for increasing viscosity, oils for lubricating, water-absorbable polymer materials, materials for cured articles, protective colloids, emulsifiers, gradually water-soluble agents for washing flush lavatories, biodegradable materials, and materials for medical treatments, etc., in which more flexibility and more water-insoluble properties than polyvinyl alcohols are demanded.

The novel lactone-modified polyvinyl alcohol of the present invention has graft chains containing primary hydroxyl groups connected to the ester groups derived from a lactone compound.

Furthermore, the novel lactone-modified polyvinyl alcohol of the present invention has an excellent compatibility with hydrophilic polymers or polar polymers, whereby can be employed as plasticizers or softening agents for a resin which have excellent properties such as not causing smoking in a molding process and not causing bleeding.

A resin composition having excellent properties can be provided by blending with hydrophilic polymers or polar polymers by using the properties as plasticizers or softening agents possessed by the novel lactone-modified polyvinyl alcohol of the present invention.

Still further, a blend resin composition in which a variety of resins are blended with the novel lactone-modified polyvinyl alcohol of the present invention has an excellent permanently anti-electrostatic property and mechanical property, and the resin composition having an excellent permanently anti-electrostatic property can be preferably employed as a variety of molded articles such as parts for electric appliances, textiles, films, etc.

Besides, a novel lactone-modified resin having hydroxyl groups of the present invention is a multi-branched type lactone polymer having high hydroxyl values, and can be widely used as pressure sensitive adhesives, adhesives, materials for a cured article, agents for increasing viscosity, lubricants, plasticizers for polymers, coatings, a variety of binders, biodegradable materials, and materials for medical treatments, etc.

BACKGROUND OF THE INVENTION

A film prepared from polyvinyl alcohol-based resins can be employed even in fields in which usual water-insoluble films are not appropriate because of its excellence in a retentive property of fragrance, a transparency, an oil resistance, an oxygen barrier property, a property for keeping warmth, and further a water-soluble property.

However, a polyvinyl alcohol alone is rigid, accordingly, it can not be molded without plasticizers. In the case when plasticizers are employed, there have been problems that generation of smoke in molding and bleeding of the plasticizers are accompanied.

In order to make a polyvinyl alcohol flexible, there are introduced proposed processes in which oxyalkylene groups are into the polyvinyl alcohol. For example, U.S. Pat. Nos. 1,971,662, 2,844,570 and 2,990,398 describe that ethyleneoxide is allowed to react by addition to a polyvinyl alcohol.

Furthermore, U.S. Pat. Nos. 4,618,648 and 4,369,281 describe of polymers in which vinyl acetate is graft polymerized in the presence of a polyalkylene glycol.

Still further, U.S. Pat. Nos. 4,618,648 and 4,675,360 copolymers composed of vinyl alcohol and a poly(alkyleneoxy)acrylate which can be molded by an injection or extrusion molding, and molded articles obtained have a water-soluble property and flexibility.

However, although the above-described polyvinyl alcohol having oxyalkylene groups has more flexibility than polyvinyl alcohol, it is not flexible at low temperatures, and further the flexibility has not been often satisfied depending upon uses even at room temperatures.

Therefore, it has been carried out that there are added both plasticizers and the above-described polyvinyl alcohol having oxyalkylene groups for the purpose of further improving a processability in molding.

For example, a polyethylene glycol or polypropylene glycol is employed in Japanese Patent Publication (Kokai) No. 203932/1991, and nylon 11, nylon 12, and a polyester elastomer are employed in Japanese Patent Kokai No. 271736/1994, as plasticizers.

However, a drawback of smoke in molding and bleeding is not solved in the former, and there is a drawback that the plasticizers are not only expensive but also transparency and rigidity in molded articles considerably lower in the latter.

In the meantime, a polyvinyl acetal-based resin in which a polyvinyl alcohol is acetalyzed has been employed as a interlayer for glasses, etc. due to a strong point of its transparency and rigidity, etc.

It is difficult to fabricate by molding the resin similarly to the polyvinyl acetal resins, and it is usually employed by mixing a large amount of ester-based plasticizers. Therefore, smoking in a molding process and bleeding out are occasionally caused in the above-described polyvinyl acetal-based resin similarly to the polyvinyl alcohol. Accordingly, there has been also expected an excellent plasticizer capable of employing also for the polyvinyl acetal-based resin.

In addition, there are expected inexpensive and novel plasticizers or softening agents having an excellent compatibility with polymers and high molecular weight which do not cause smoking in a molding process and bleeding out, in order to improve moldability and flexibility also in polymers other than the above-described polyvinyl alcohol and polyvinyl acetal resin.

Also, although water solubility of polyvinyl alcohol can be generally adjusted by controlling saponification degree, it is difficult to minutely adjust the water solubility in a range from gradually water-soluble level to water-insoluble level by only controlling the saponification. In the case when water solubility is adjusted only by controlling saponification, not only difficulty in adjusting the water solubility, but also other properties such as flexibility and adhesive properties have been often deteriorated.

On the other hand, there has been conventionally put into practice a study for improving flexibility of starting polymers by the addition polymerization of lactone monomers using polymers having hydroxyl groups in the molecule. For example, Japanese Patent Publication (Kokoku) Nos. 1607/1987 and 20252/1988 (corresponding to U.S. Pat. No. 4,522,904) disclose that an epoxy resin prepared by bisphenol A and epichlorohydrin is improved in flexibility by the addition polymerization of lactone monomers using the epoxy resin, resulting in becoming difficult to break even after cured.

Nothing has been reported until now that lactone monomers were polymerized by the addition polymerization to polyvinyl alcohol in spite of its capability of forecasting to a certain extent. Therefore, properties of a lactone-modified polyvinyl alcohol obtained have not been analyzed, and also the utilization in industries has not been studied.

Furthermore, the present inventors disclosed methods for preparing a graft polymer and a block polymer by the addition polymerization of a lactone monomer to starting resins in Japanese Patent Publication (Kokai) Nos. 52950/1991 and 134011/1991. Those are polymers in which a styrene-2-hydroxyethylmethacrylate-based copolymer is a main chain polymer and polycaprolactone units are graft chains.

Still further, the present inventors disclosed methods for preparing a linear polymer and a broom-shaped block polymer by the addition polymerization of lactone monomers to polystyrenes having 1–2 or 5–50 hydroxyl groups at terminal positions in the specifications of Japanese Patent Applications No. 164560/1994 and No. 251241/1994.

In addition to the above-described disclosures, the present inventors disclosed that polymers having hydroxyl groups in the molecular chain are employed as an initiator in the case of preparing polylactones.

For example, the present inventors disclosed an example that 2-hydroxyethyl methacrylate is employed as an initiator to prepare copolymerized or grafted polymers in Japanese Patent Unexamined Publication (Kokai) No. 192410/1995.

Also, the present inventors disclosed a case that a branched polylactone is prepared by the addition polymerization of a lactone monomer with polyfunctional initiators which have at least 3 functionalities, and a case that an oligomer having a radically polymerizable double bond together with a hydroxyl group such as 2-hydroxyethyl (meth)acrylate is employed as an initiator to prepare a copolymer with other radically polymerizable monomers and a graft-modified polymer with a variety of polymers, for example, a graft-modified polymer prepared from sugars, starch, and celluloses, etc., in the specification of Japanese Patent Application No. 47384/1995.

However, it is important to obtain polylactones having a high melt viscosity in processes relating to the cases, and actually, there are employed initiators having 3 to 4 functional groups in the molecule such as trimethylolpropane and pentaerythritol, etc., and it has not been almost studied that there were employed initiators having at least 10 functional groups in the molecule for preparing the polylactones.

Generally speaking, although plastic materials have been used in a variety of fields owing to its excellent properties, there has been a drawback that those readily accumulate static electricity because of its hydrophobic property. If an anti-electrostatic property can be given to the plastics materials, the use fields thereof can be further enlarged.

Specifically, it enables to enlarge the use fields such as a copy machine, facsimile, computer, printer, clothes made of synthetic textile, and parts requiring prevention of dust, etc.

Many attempts for giving an anti-electrostatic property to plastic materials have been tried until now. For example, there are mentioned methods that anti-static agents are coated on the surface of a thermoplastic resin or mixed therein.

There are disclosed a variety of processes in order to improve an anti-electrostatic property by giving a hydrophobic property to plastic materials. For example, although Japanese Patent Unexamined Publication (Kokai)Nos. 53465/1975, 6049/1979, and 38123/1985 describe that metal salts of sulfonic acid are used as an anti-static agent, there have been problems that the anti-electrostatic property remarkably decreases with lapse of time and that the anti-static agent is removed by washing with water, etc.

Furthermore, there is also known a process in order to keep long the anti-electrostatic property by mixing a resin having hydrophilic property and optionally the anti-static agent with thermoplastic resin.

As a most typical process, although a process in which a polyalkyleneoxide is used together with the metal salts of sulfonic acid is proposed in Japanese Patent Publication (Kokoku) No. 11944/1985, there are problems that not only mechanical properties and heat resistance in the polyalkyleneoxide itself are poor but also a variety of properties in resin compositions obtained sharply decline because of a poor compatibility with a thermoplastic resin having a hydrophobic property.

Even other polymers having a hydrophilic property, for example, such as polyvinyl alcohol and polyethylene glycol have similar problems.

As a case, there have been also tried many attempts for giving a permanently anti-electrostatic property to a styrene-based resin which is one of the thermoplastic resins. For example, Japanese Patent Unexamined Publication (Kokai) No. 36237/1980 discloses a process in which a vinyl-based monomer having alkylene oxide group is graft-copolymerized with rubber components in a styrene-acrylonitrile-butadiene resin copolymer (ABS resin). However, the resin obtained by graft-polymerization of a hydrophilic elastomer described in Japanese Patent Unexamined Publication (Kokai) No. 36237/1980 is prepared by a complicated preparation process, and mechanical properties in the resin obtained are not sufficiently satisfied.

Furthermore, Japanese Patent Unexamined Publication (Kokai) No. 269147/1990 discloses a process in which a copolymer composed of alkylene oxide and epichlorohydrine is added. Still further, it is known that a polyetheresteramide in which a polyamide and a polyether are connected through a dicarboxylic acid has an excellent rubber-like elasticity and a good anti-electrostatic property.

However, the polyetheresteramide is poor in compatibility with other thermoplastic resins, for example, a vinyl-based polymer such as a polystyrene, a styrene-acrylonitrile copolymer resin (AS resin), a polymethylmethacrylate (PMMA), a styrene-methylmethacrylate copolymer resin, styrene-butadieneacrylonitrile copolymer resin (ABS resin). Therefore, for example, Japanese Patent Unexamined Publication (Kokai) No. 246344/1986 discloses that a composition has a permanently anti-electrostatic property which is composed of (A) a polyetheresteramide, (B) a graft copolymer in which (meth)acrylic esters and/or aromatic vinyl monomers are polymerized with a rubber-like polymer, and (C) a copolymer (styrene-based polymer) in which a mixture composed of monomers such as a (meth)acrylate, an aromatic vinyl and/or vinyl cyanate monomers is copolymerized.

Still further, Japanese Patent Unexamined Publication (Kokai) No. 23435/1985 discloses that a mechanical strength in a composition is improved by blending a polyetheresteramide with a modified vinyl-based polymer having carboxylic groups.

Besides, Japanese Patent Unexamined Publication (Kokai) No. 163251/1989 discloses that a modified vinyl-based polymer having amino groups or substituted amino groups is employed in order to improve its mechanical strength by improving compatibility between a styrene-based resin and a polyetheresteramide and, further, Japanese Patent Unexamined Publication (Kokai) No. 70739/1990 discloses that a rubber-modified styrene-based thermoplastic resin, etc. having a vinyl monomer containing hydroxyl groups which is a component in copolymerization is employed as a third component.

Also, although the processes described in Japanese Patent Unexamined Publication (Kokai) No. 269147/1990 can improve mechanical properties, and improve permanently anti-electrostatic properties and a layer-state cleavage, the epichlorohydrin copolymer which is a primary component is expensive, resulting in that a final composition is not always low in price.

The processes described in Japanese Patent Unexamined Publication (Kokai) No. 23435/1985 also have a drawback that badness in outer appearance is caused such as silver streaks and frosting. Even in the case of thermoplastic resins for molding other than styrene-based resins, there has been desired a composition having excellent properties such as mechanical strength and thermal resistance, etc., and further permanently anti-electrostatic properties.

As a result of an intensive study for the purpose of solving the above-mentioned problems, the inventors of this invention have found that it is possible to prepare a resin having permanently anti-electrostatic properties and an excellent mechanical strength by mixing resins for molding with a suitable amount of a lactone-modified polyvinyl alcohol which has an excellent compatibility with thermoplastic resins.

Furthermore, the inventors of this invention, as a result of a further continued study for the purpose of providing a polylactone having new functions and uses by polymerizing lactone monomers, have found that a lactone-modified resin having hydroxyl groups which has a specified range in the mole number of hydroxyl groups per 1 g of a polymer and a specified range in number average molecular weight can be obtained by using a small amount of a specified starting polymer having at least 10 hydroxyl groups as an initiator.

As the polymer having many hydroxyl groups in the molecule is flexible, it can be used in a wide use such as pressure-sensitive adhesives, adhesives, materials for cured articles, molded articles such as cured sheets and cured films, plasticizers for polymers, coatings, biodegradable uses, and uses for medical treatments, etc.

In view of the circumstances as described hereinabove, as a result of an intensive study, the inventors of this invention have found that it is possible to solve the above-described various problems by a novel lactone-modified polyvinyl alcohol.

SUMMARY OF THE INVENTION

It is an object of the present invention to provide a lactone-modified polyvinyl alcohol, a process for the preparation thereof, a resin composition, a permanently anti-electrostatic resin composition, a lactone-modified resin having hydroxyl groups, and a process for the preparation thereof.

A first aspect of the present invention relates to a lactone-modified polyvinyl alcohol which comprises having a structure represented by General Formula (1) as described below

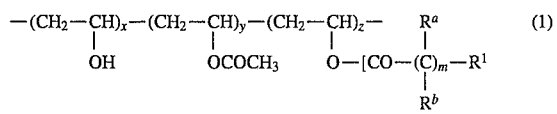

[wherein, x, y, and z are a composition by mol in the respective components, having a range of 0≦x≦95, 0≦y≦30, 5≦z≦100, x+y+z is 100, respective components shown by x, y, and z are randomly connected, $R^a$ and $R^b$ is an independent hydrogen atom or a methyl group, m is a natural number ranging from 2 to 10, and $R^1$ is a hydrogen atom or an acetyl group, n is an average number of a lactone monomer to be added, and a range of 1≦n≦100].

A second aspect of the present invention relates to a process for the preparation of the lactone-modified polyvinyl alcohol having the structure represented by the above General Formula (1), which comprises kneading 5–95 parts by weight of a polyvinyl alcohol with 95–5 parts by weight of a lactone monomer (total of both is 100 parts by weight) and 0.001–0.1 parts by weight of a polymerization catalyst while melting at a temperature of 50°–250° C.

A third aspect of the present invention relates to a resin composition which comprises mixing (A) 5–30 parts by weight of a lactone-modified polyvinyl alcohol having a structure represented by General Formula (1) as described below

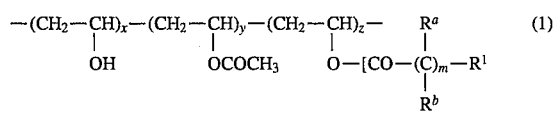

wherein x, y, and z are a composition by mol in the respective components, having a range of 0≦x≦95, 0≦y≦30, 5≦z≦100, x+y+z is 100, respective components shown by x, y, and z are randomly connected, $R^a$ and $R^b$ is each an independent hydrogen atom or a methyl group, m is a natural number ranging from 2 to 10, and $R^1$ is a hydrogen atom or an acetyl group, n is an average number of a lactone monomer to be added, and a range of 1≦n≦100, (B) 95–70 parts by weight of a hydrophilic polymer or a polar polymer [total of the components (A) and (B) is 100 parts by weight].

A fourth aspect of the present invention relates to a permanently anti-electrostatic resin composition which comprises mixing (A) 5–30 parts by weight of a lactone-modified polyvinyl alcohol having a structure represented by General Formula (1)

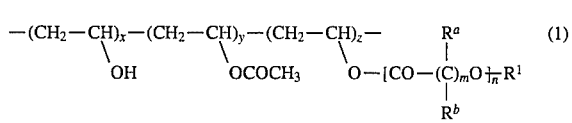 (1)

wherein, x, y, and z are a composition by mol in the respective components, having a range of $0 \leq x \leq 95$, $0y \leq 30$, $5 \leq z \leq 100$, x+y+z is 100, respective components shown by x, y, and z are randomly connected, $R^a$ and $R^b$ is an independent hydrogen atom or a methyl group, m is a natural number ranging from 2 to 10, and $R^1$ is a hydrogen atom or an acetyl group, n is the average number of a lactone compound to be added, and a range of $1 \leq n \leq 100$, (B) 95–70 parts by weight of a thermoplastic resin and, (C) 0–5 parts by weight of a metal salt of sulfonic acid [total of the components (A), (B), and (C) is 100 parts by weight].

A fifth aspect of the present invention relates to a lactone-modified resin having hydroxyl groups characterized by being represented by General Formula (2) as described below

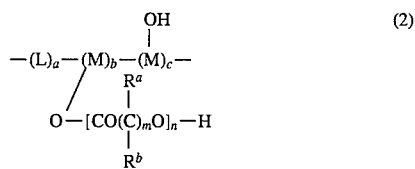 (2)

[in Formula (2), L is a monomer structural unit not having hydroxyl groups or structural unit, M is a monomer residual group having hydroxyl groups in the molecule or structural unit, a, b, c, and n represent an average polymerization degree in respective structural units ranging in $0 \leq a \leq 1000$, $10 \leq b \leq 5000$, $0 \leq c \leq 1000$, and $2 \leq n \leq 100$, $R^a$ and $R^b$ is an independent hydrogen atom or a methyl group, m is a natural number of 2–10, and the respective structural units of a, b, and c pieces are randomly connected], which has a hydroxyl group mol number ranging from $1 \times 10^{-4}$ to $1 \times 10^{-2}$ mol per one molecule, hydroxyl group number ranging from 10 to 5,000 per one molecule, and a number average molecular weight ranging from 20,000 to 2,000,000.

A sixth aspect of the present invention relates to a process for the preparation of a lactone-modified resin having hydroxyl groups represented by the above-described General Formula (2), which comprises kneading while melting (A+B) 100 parts by weight of a mixture composed of (A) 0.1–30% by weight of a polymer represented by the following General Formula (3) having 10–5,000 hydroxyl groups per one molecule

 (3)

[in Formula (S), L is a monomer structural unit not having hydroxyl groups, M is a monomer residual group having hydroxyl groups in the molecule, the subscripts a and (b+c) represent an average polymerization degree, $0 \leq a \leq 1000$, $10 \leq b+c \leq 5000$, the respective structural units of a and (b+c) pieces are randomly connected] and (B) 99.9–70% by weight of a lactone monomer represented by General Formula (4) described below

 (4)

[in Formula (4), $R^a$ and $R^b$ is an independent hydrogen atom or a methyl group, m is a natural number of 2–10] with 0.001–0.1 parts by weight of a polymerization catalyst.

DETAILED DESCRIPTION OF THE INVENTION

Figure 1:
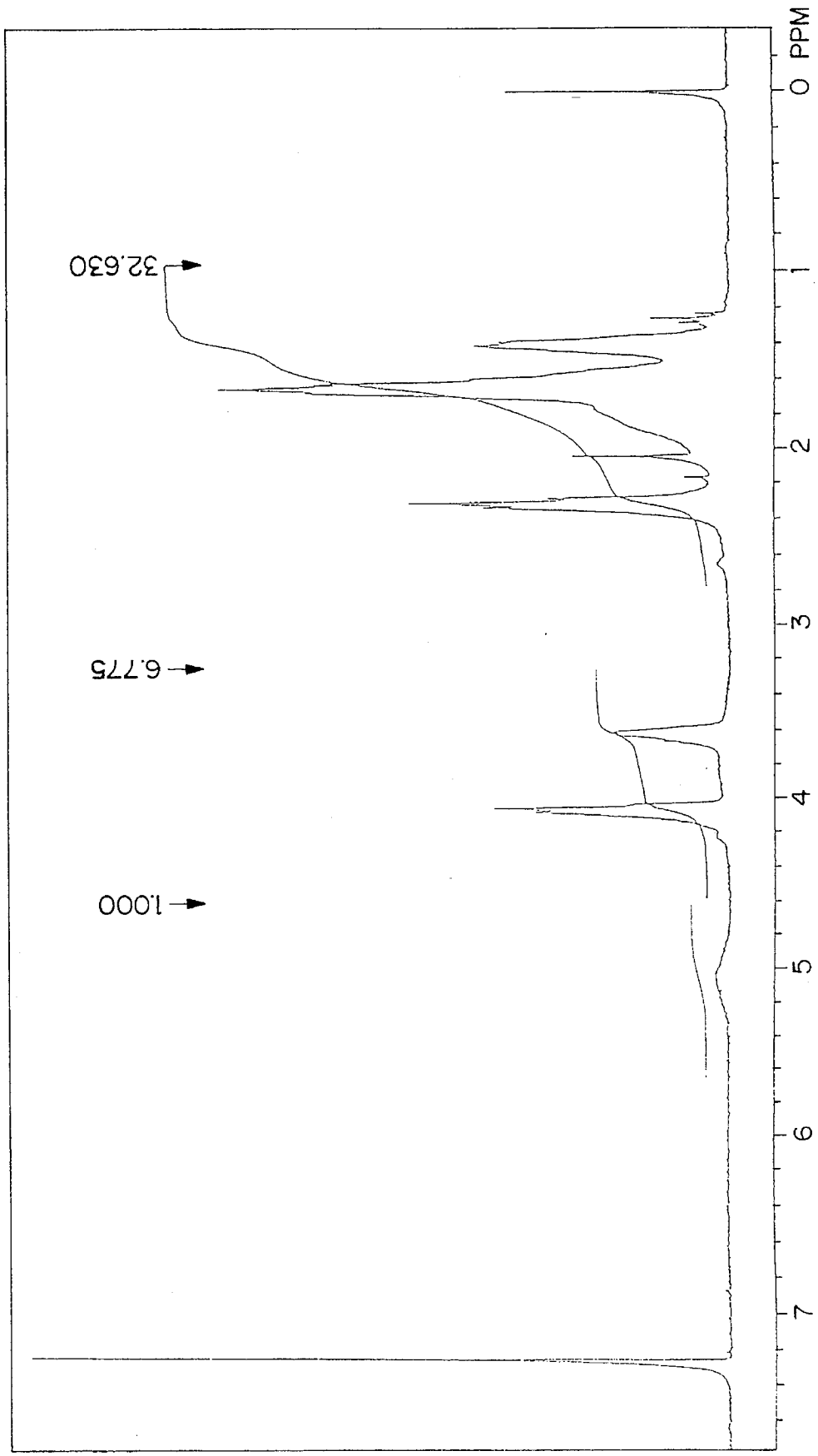
FIG. 1 is an $^1$H-NMR chart related to the lactone-modified polyvinyl alcohol obtained in Example 1.

The present invention will be illustrated hereinafter in more detail.

According to a first aspect of the present invention, there is provided a lactone-modified polyvinyl alcohol which comprises having a structure represented by General Formula (1) as described below

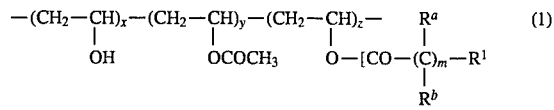 (1)

[wherein, x, y, and z are a composition by mol in the respective components, having a range of $0 \leq x \leq 95$, $0 \leq y \leq 30$, $5 \leq z \leq 100$, x+y+z is 100, respective components shown by x, y, and z are randomly connected, $R^a$ and $R^b$ are an independent hydrogen atom or a methyl group, m is a natural number ranging from 2 to 10, and $R^1$ is a hydrogen atom or an acetyl group, n is an average number of a lactone monomer to be added, and a range of $1 \leq n \leq 100$].

According to a second aspect of the present invention, there is provided a process for the preparation of a lactone-modified polyvinyl alcohol having the structure represented by the above General Formula (1), which comprises kneading 5–95 parts by weight of a polyvinyl alcohol with 95–5 parts by weight of a lactone monomer (total of both is 100 parts by weight) and 0.001–0.1 parts by weight of a polymerization catalyst while melting at a temperature of 50°–250° C.

In the lactone-modified polyvinyl alcohol of the present invention represented by the above-described General Formula (1), x, y, and z is mol composition by %, and x+y+z is 100. A scope of x is $0 \leq x \leq 95$, preferably $5 \leq x \leq 80$, and more preferably $10 \leq x \leq 70$.

In the case when x nears to 0, a hydrophilic property in the lactone-modified polyvinyl alcohol lowers, resulting in a decrease of properties based on the hydrophilic property. Accordingly, it is preferably adjusted depending upon uses. Contrarily, in the case when x exceeds 95 mol %, there decrease a flexibility, fluidity, solubility, lipophilic property, and compatibility to resins, etc. which appear by the addition polymerization of lactone monomer, unpreferably resulting in that properties is not almost different from properties of a starting polyvinyl alcohol itself.

A scope of y is $0 \leq y \leq 30$, preferably $0 \leq y \leq 20$, and more preferably $0 \leq y \leq 15$. In the case when y exceeds 30 mol %, there are not unpreferably balanced the properties such as a pressure-sensitive adhesive property, hydrophilic property, fluidity, flexibility, and compatibility, etc. in the lactone-modified polyvinyl alcohol of the present invention.

Accordingly, in order to control a balance of the properties, Y is preferably adjusted to a most appropriate mol % within the scope of $0 \leq y \leq 30$.

A scope of z is $5 \leq z \leq 100$, preferably $15 \leq z \leq 90$, and more preferably $20 \leq z \leq 85$. In the case when z is below 5 mol %, there decrease a flexibility, fluidity, solubility, lipophilic property, and compatibility to resins, etc. which appear by the addition polymerization of lactone monomer, unpreferably resulting in that properties is not almost different from properties of a starting polyvinyl alcohol itself, contrarily, in the case when z nears to 100, there unpreferably decrease the hydrophilic properties in the lactone-modified polyvinyl alcohol.

In the above-described General Formula (1), $R^a$ and $R^b$ are each an independent hydrogen atom or a methyl group, and m is a natural number of 2–10. In the case when epsilon-caprolactone is employed which is an industrially most useful lactone monomer, both $R^a$ and $R^b$ are hydrogen, and m is 5.

$R^1$ is basically a hydrogen atom or an acetyl group. The above-described hydrogen atom or an acetyl group is not particularly limited in a scope of the composition % by mol, and it can be fixed by adjusting the preparation processes and conditions for preparation of the lactone-modified polyvinyl alcohol of the present invention.

n is the average number of a lactone to be added, a range of $1 \leq n \leq 100$, preferably $1.2 \leq n \leq 30$, more preferably $1.5 \leq n \leq 20$. In the case when n is below 1, the value of z in General Formula (1) is below 5, resulting in that the addition polymerization of lactone monomer becomes meaningless and, contrarily, in the case when n exceeds 100, unpreferably resulting in that there cause problems such as disappearance of the hydrophilic properties and a considerable deterioration of a fluidity in the lactone-modified polyvinyl alcohol.

Also, the polymerization degree of oxyethylene units of main chain in the lactone-modified polyvinyl alcohol of the present invention ranges from 100 to 10,000, preferably from 300 to 3,000, more preferably from 500 to 2,000. In the case when the above-described polymerization degree is below 100 and exceeds 10,000, not only the lactone-modified polyvinyl alcohol is limited in the uses, but also preparation thereof becomes difficult, resulting in being unpreferred.

According to the second aspect of the present invention, there is provided a process for the preparation of a lactone-modified polyvinyl alcohol represented by the above-described General Formula (1) characterized by mixing 5–95 parts by weight of a polyvinyl alcohol with 95–5 parts by weight of a lactone monomer (total of both is 100 parts by weight) and 0.001–0.1 parts by weight of a polymerization catalyst by melting at a temperature of 50°–250° C.

In the following, the process for the preparation thereof is illustrated.

A polyvinyl alcohol which is one starting material and a lactone monomer which is another starting material are preferably mixed at a most appropriate mixing ratio in the above-described mixing ratio range from a viewpoint of a balance among properties in uses of the lactone-modified polyvinyl alcohol obtained, in order to carry out the process for the preparation of the lactone-modified polyvinyl alcohol of the present invention. A polyvinyl alcohol which is employed as one starting material in the present invention can be usually obtained by a complete or partial saponification of a polyvinyl acetate.

The polymerization degree of oxyethylene units in the above-described polyvinyl alcohol ranges from 100 to 10,000, preferably from 300 to 3,000, more preferably from 500 to 2,000. In the case when the polymerization degree is below 100 and exceeds 10,000, preparation thereof unpreferably is difficult.

Those having the polymerization degree ranging from 100 to 10,000 are preferably employed depending upon uses of the lactone-modified polyvinyl alcohol of the present invention. Also, the saponification degree of the above-described polyvinyl alcohol is not less than 70% by mol, preferably not less than 80% by mol, more preferably not less than 85% by mol.

In the case when the saponification degree is below 70% by mol, there are not unpreferably balanced the properties such as a pressure-sensitive adhesive property, hydrophilic property, fluidity, flexibility, and compatibility, etc. in the lactone-modified polyvinyl alcohol of the present invention. Contrarily, the saponification degree can be preferably adjusted at a most appropriate mol % in not less than 70% by mol in order to control a balance of the properties.

As specific examples of the lactone monomers to be employed in the present invention, there are exemplified methylated lactones such as epsilon-caprolactone, 4-methylcaprolactone, etc., delta-valerolactone, beta-propiolactone, valerolactone, etc. Of those, epsilon-caprolactone which is industrially most useful is preferably employed.

In the case when epsilon-caprolactone is employed, $R^a$ and $R^b$ are hydrogen atom, and m is an integer of 5 in the above-described General Formula (1). It is to be noted that more than two kinds of the above-described lactone monomers can be also employed in any mixing composition.

Catalysts for polymerization to be employed in the present invention are catalysts for the ring-opening addition polymerization of the lactone monomers. Specifically, there are exemplified inorganic bases, inorganic acids, organic alkali metal catalysts, tin compounds, titanate compounds, aluminum compounds, zinc compounds, molybdenum compounds, and zirconium compounds, etc. Of those, tin compounds and titanium compounds are preferably employed from a viewpoint of a balance among readily handling, lower toxicity, reactivity, coloringless property, and thermal stability, etc. As the tin compounds, there are exemplified monobutyl tin compounds such as stannous chloride, stannous octylate, monobutyltin oxide, monobutyltin tris(2-ethylhexanate), etc., dibutyl tin compounds such as dibutyl tin oxide, etc. Furthermore, as titanium compounds, there are exemplified tetrabutyl titanate, tetra-isopropyl titanate, etc.

Addition amount of the catalysts for polymerization ranges from 0.001 to 0.1 parts by weight, preferably ranging from 0.002 to 0.05 parts by weight, and more preferably from 0.005, to 0.01 parts by weight based on the total 100 parts by weight of both starting materials.

In the case when the above-described catalyst amount is below 0.001 parts by weight, there is slow the rate in the addition polymerization of the lactone monomer and, contrarily, in the case when it exceeds 0.1 parts by weight, a lactone-modified polyvinyl alcohol obtained occasionally colors and its thermal stability lowers, resulting in being not preferred.

In the case when polyvinyl alcohol is below 5 parts by weight and lactone monomer exceeds 95 parts by weight, properties such as the hydrophilic property in the lactone-modified polyvinyl alcohol of the present invention lower and, contrarily, in the case when polyvinyl alcohol exceeds 95 parts by weight and lactone monomer is below 5% by weight, there unpreferably lower a flexibility, fluidity, solubility, lipophilic property, and compatibility with resins, etc., which appear by the addition polymerization of the lactone monomer.

The polymerization temperature ranges from 50° to 250° C., preferably 100° to 220° C., and more preferably 160° to 200° C.

In the case when it is below 50° C., rate in the addition polymerization of lactone monomer is slow and, contrarily, in the case when it exceeds 250° C., a thermal decomposition reaction or coloring of a lactone adduct occurs, and products by the decomposition are produced, resulting in being not preferred.

In the process for the preparation of the lactone-modified polyvinyl alcohol of the present invention, as apparatuses for kneading while melting, publicly known kneaders can be employed without any problems.

Specifically, there are desirably employed a batch type kneader having blades for agitating, a kneader type mixer, a screw type kneader such as an extruder, etc., a static mixer type kneader, and an apparatus in which the mixers or kneaders are continuously combined.

In the process for the preparation of the lactone-modified polyvinyl alcohol of the present invention, although the starting materials and polymerization catalysts can be added without any limitations, and order and/or methods for adding are not also limited at all, water content in the starting materials is desirably adjusted to not more than 0.5% by weight, preferably not more than 0.1% by weight, and more preferably not more than 0.05% by weight.

In the case when the water content in the starting materials exceeds 0.5% by weight, addition polymerization of lactone monomers to water occurs, resulting in producing polycaprolactone oligomers by which the lactone-modified polyvinyl alcohol occasionally whitens or a variety of properties occasionally lowers.

According to a third aspect of the present invention, there is provided a resin composition which comprises mixing (A) 5–30 parts by weight of a lactone-modified polyvinyl alcohol having the structure represented by the above-described General Formula (1) and (B) 95–70 parts by weight of a hydrophilic polymer or a polar polymer [total of two components (A) and (B) is 100 parts by weight].

In the third aspect of the present invention, a scope of x in General Formula (1) is $0 \leq x \leq 95$, preferably $10 \leq x \leq 85$, and more preferably $15 \leq x \leq 80$, as described hereinabove.

In the case when x is close to 0, the hydrophilic properties decrease and contrarily, in the case when x exceeds 95% by mol, it unpreferably results in that properties are not almost different from properties of the starting polyvinyl alcohol itself.

As described hereinabove, a scope of y is $0 \leq y \leq 30$, preferably $0 \leq y \leq 20$, and more preferably $0 \leq y \leq 15$. In the case when y exceeds 30% by mol, the amounts of lactone to be added must be decreased in order to maintain the hydrophilic property, unpreferably resulting in that there decrease flexibility and a plasticizing effect in the lactone-modified polyvinyl alcohol. Inevitably, y is preferably adjusted to a most appropriate mol % value of $0 \leq y \leq 30$ in order to control a balance among the hydrophilic property (a compatibility with a hydrophilic polymer or polar polymer), flexibility, and a plasticizing effect.

As described hereinabove, a scope of z is $5 \leq z \leq 100$, preferably $15 \leq z \leq 90$, and more preferably $20 \leq z \leq 85$. In the case when z is below 5 mol %, it unpreferably results in that properties is not almost different from properties of a starting polyvinyl alcohol itself and, contrarily, in the case when z exceeds 95% by weight, it unpreferably results in that there considerably decreases the hydrophilic property in the lactone-modified polyvinyl alcohol.

As described hereinabove, n is the average number of a lactone to be added, a range of $1 \leq n \leq 100$, preferably $1.2 \leq n \leq 30$, and more preferably $1.5 \leq n \leq 20$. In the case when n is below 1, it unpreferably results in that properties are not almost different from properties of a starting polyvinyl alcohol itself and, contrarily, in the case when n exceeds 100, it unpreferably results in that there almost disappears the hydrophilic property in the lactone-modified polyvinyl alcohol and there considerably decreases the compatibility with hydrophilic polymers.

In the third aspect of the present invention, the lactone-modified polyvinyl alcohol is used as a softening agent or a plasticizer, and a solubility thereof to solvents sharply changes depending upon a degree of modification by lactones. That is, in the case when the degree of modification by lactones is few, it is water soluble, and in the case when the degree of modification by lactones increases, a property changes from low water-soluble to water-insoluble, resulting in becoming soluble into organic solvents such as chloroform and THF, etc.

Accordingly, it is preferably used by adjusting the degree of modification by lactones depending upon the compatibility with hydrophilic polymers or polar polymers to be employed.

In the third aspect of the present invention, melt viscosity is also an important factor showing a moldability of the lactone-modified polyvinyl alcohol. Although the most appropriate viscosity is inevitably different depending upon uses, moldability is good and handling is easy in viscosity values ranging from minimum 10 poise at 140° C. to maximum 30,000 poise or so at 260° C. when measured by a melt flow-tester with an orifice having the diameter of 1 mm and the length of 10 cm with the load of 10 kg/cm$^2$.

A most appropriate viscosity is necessarily different depending upon uses, it is easy to handle owing to a good moldability in a scope ranging from 10 to 10,000 when melt viscosity is measured at 160°–240° C. with the load of 10 kg/cm$^2$.

A hydrophilic or polar polymer which is the component (B) in the third aspect of the present invention is thermoplastic, and includes a polymer exhibiting a good compatibility with the lactone-modified polyvinyl alcohol. For example, a popular hydrophilic polymer has a good compatibility with the lactone-modified polyvinyl alcohol having a low degree of modification by lactones.

As the above-described hydrophilic polymer, there are exemplified an ethylene oxide-modified polyvinyl alcohol, a completely saponified polyvinyl alcohol, a partially saponified polyvinyl alcohol, a completely or partially saponified ethylenevinyl acetate copolymer, a polyethylene glycol, a polypropylene glycol, a polyvinylether, a polyvinyl acetal having a low acetalization degree, a polyglycerine, a polyepichlorohydrin, a polysaccharide such as starch or cellulose, etc., polypeptides, a polyamino acid.

Also, the above-described lactone-modified polyvinyl alcohol having a low degree of modification by lactones includes polyvinyl alcohol component of more than 40% by weight, preferably more than 50% by weight, more preferably more than 60% by weight (not exceeding 98% by weight) in the total of the lactone-modified polyvinyl alcohol.

Of the above-described hydrophilic polymers, the completely or partially saponified polyvinyl alcohol not only has a value by being plasticized but also has a very good compatibility with the above-described lactone-modified polyvinyl alcohol having a low degree of modification by lactones, resulting in being very significant from the viewpoint of practical uses.

A polar polymer which is the component (B) in the third aspect of the present invention has a good compatibility with the lactone-modified polyvinyl alcohol having a high degree of modification by lactones.

As such the polar polymer, there are exemplified a polyvinyl acetal, a polyoxymethylene, a polyoxymethylene copolymer, a polyamide, a polyester, a polycarbonate, a polymethylmethacrylate,apoly(styrene-acrylonitrile)copolymer, a polyimide, a polysulfone, a polyether sulfone, and a polyetheretherketone, etc.

Also, the above-described lactone-modified polyvinyl alcohol having a high degree of modification by lactones includes polyvinyl alcohol component of from 1% by weight to 50% by weight, preferably from 2% by weight to 30% by weight, more preferably from 5% by weight to 20% by weight in the total of the lactone-modified polyvinyl alcohol.

Of the above-described polar polymers, the polyvinyl acetal, polyoxymethylene, and polyoxymethylene copolymer not only have a high importance by being plasticized but also has a very good compatibility with the lactone-modified polyvinyl alcohol having a high degree of modification by lactones, resulting in possessing a great value from the viewpoint of practical uses.

The resin composition which is the third aspect of the present invention is a mixture composed of 5–80% by weight of the lactone-modified polyvinyl alcohol represented by General Formula (1) and 20–95% by weight of the hydrophilic or polar polymer, and the former is preferably a scope of 10–75% by weight, more preferably 15–70% by weight based on the total.

In the case when the former is below 5% by weight based on the total, a plasticizing effect and a flexibility degree are not satisfied and, contrarily, in the case when it exceeds 80% by weight, the hydrophilic property and an inherent rigidness in the polar polymers are unpreferably lost because of an excessive flexibility.

In the case when the resin composition which is the third aspect of the present invention is prepared, the lactone-modified polyvinyl alcohol can be mixed with the hydrophilic or polar polymer without any limitations and, particularly, those are preferably employed with publicly known melt kneaders. As the above-described kneaders, there are exemplified a batch type kneader having blades for agitating, a kneader type mixer, a screw type kneader such as an extruder, etc., a static mixer type kneader, and an apparatus in which the mixers or kneaders are continuously combined.

The kneading temperature while melting ranges from 100° to 280° C., preferably 140° to 240° C., and more preferably 160° to 200° C.

In the case when it is below 100° C., it is difficult for the former to be homogeneously mixed and, in the case when it exceeds 280° C., a thermal decomposition reaction or coloring in a polyvinyl alcohol occurs, and products by the decomposition are produced, resulting in being not preferred.

Also, in the process that the lactone-modified polyvinyl alcohol represented by General Formula (1) is mixed with the hydrophilic or polar polymer, a polyvinyl alcohol and lactone monomer which constitute the lactone-modified polyvinyl alcohol may be directly kneaded while melting with the hydrophilic or polar polymer together with catalysts, preferably resulting in being simultaneously mixed with the hydrophilic or polar polymer while proceeding the addition polymerization of the lactone.

Furthermore, there may be limitlessly mixed publicly known additives such as anti-oxidants, thermal stabilizers, and plasticizers, etc. which are employed as general purposes, other thermoplastic resins, inorganic fillers with the lactone-modified polyvinyl alcohol which is employed as plasticizers or softening agents for resins in the third aspect of the present invention, as far as effects in the present invention are not hindered.

According to a fourth aspect of the present invention, there is provided a permanently anti-electrostatic resin composition which comprises mixing (A) 5–30 parts by weight of a lactone-modified polyvinyl alcohol having the structure represented by the above-described General Formula (1), (B) 95–70 parts by weight of a thermoplastic resin, and (C) 0–5 parts by weight of a metal salt of sulfonic acid [total of three components (A), (B), and (C) is 100 parts by weight].

In the fourth aspect of the present invention, the lactone-modified polyvinyl alcohol which is the component (A) is represented by the above-described General Formula (1). x, y, and z are composition % by mol, and x+y+z equals to 100% by mol as described hereinabove. A scope of x is $0 \leq x \leq 95$, preferably $30 \leq x \leq 80$, and more preferably $40 \leq x \leq 70$.

In the case when x is excessively small, hydrophilic properties in the lactone-modified polyvinyl alcohol decrease and, contrarily, in the case when it exceeds 95% by mol, there decreases a compatibility with thermoplastic resins and there decrease mechanical strength and thermal stability in the resin composition, resulting in being not preferred.

A scope of y is $0 \leq y \leq 30$, preferably $0 \leq y \leq 20$, and more preferably $0 \leq y \leq 15$. In the case when y exceeds 30% by mol, there are unpreferably ill-balanced properties such as the hydrophilic property in the lactone-modified polyvinyl alcohol and a compatibility with thermoplastic resins.

Inevitably, y is preferably adjusted to a most appropriate mol % in a scope of $0 \leq y \leq 30$ in order to control a balance between properties.

A scope of z is $5 \leq z \leq 100$, preferably $20 \leq z \leq 70$, and more preferably $30 \leq z \leq 60$. In the case when z is below 5% by mol, a compatibility with thermoplastic resins decreases and, contrarily, in the case when z is excessively large, the hydrophilic property decreases, unpreferably resulting in being not preferred.

The component (B) in the permanently anti-electrostatic resin composition which is the fourth aspect of the present invention is a thermoplastic resin which is publicly known, or a mixture thereof.

Specifically, there are exemplified thermoplastic polyester resins, polycarbonate resins, styrene-based resins (particularly, polystyrenes, rubber-reinforced polystyrene-based resins, ABS resins), polyacrylic-based resins, polyphenylene ether resins, polyoxymethylene resins, polyamide resins, polysulfone resins, polyethylene resins, polypropylene resins, thermoplastic polyurethane resins, polyvinyl chloride resins, a variety of elastomers, thermoplastic rubbers, and resin mixtures thereof.

Of those, there are preferably employed thermoplastic polyester resins which have a very excellent compatibility with lactone components, polycarbonate resins, ABS resins, and a mixture of those with other thermoplastic resins. The above-described thermoplastic polyester resins include polymers or copolymers obtained by polycondensation of glycols having a carbon number of 2–6, for example, such as ethylene glycol, propylene glycol, 1,4-butanediol, neopentyl glycol, hexamethylene glycol, etc., which are glycol components with telephthalic acid, isophthalic acid, alkyl-substituted compounds thereof, halogen-substituted compounds thereof which are dicarboxylic acid components.

Specifically, there are exemplified a polyethylene terephthalate, a polypropylene terephthalate, a polybutylene terephthalate, a polyhexylene terephthalate, a polyethylene naphthalate, a polybutylene naphthalate, a polyethylene-1, 2-bis(phenoxy)ethane-4,4'-dicarboxylate, polyethylene isophthalate/terephthalate, polybutyleneisophthalate/terephthalate, and polybutylene terephthalate/decanedicarboxylate, etc. Furthermore, there are also included polyarylates obtained by polycondensation of dicarboxylic halides such as terephthalic dichloride, and isophthalic dichloride with divalent phenols such as 2,2-bis(4-hydroxyphenyl)propane, etc.

Of those, there are preferably employed a polyethylene terephthalate and a polybutylene terephthalate which are well-balanced in mechanical properties and moldability. Number average molecular weight in the thermoplastic polyester resins is not particularly limited, and resins having a scope of 10,000–35,000 are preferably employed.

Polycarbonate resins are polymers or copolymers obtainable by phosgene methods in which a variety of divalent phenols are allowed to react with phosgene, and by transesterification methods of divalent phenols with carbonate esters such as diphenyl carbonate.

As the divalent phenols to be employed, there are exemplified 2,2-bis-(4-hydroxyphenyl)propane, 2,2-bis-(4-hydroxyphenyl)butane, 2,2-bis-(4-hydroxyphenyl)-4-methylpentane, 4,4'-dihydroxy-2,2,2-triphenylethane, 2,2-bis-(4-hydroxy-3-methylphenyl)propane, 1,1'-bis-(4-hydroxyphenyl)-paradiisopropylbenzene, 1,1'-bis-(4-hydroxyphenyl)-cyclohexane, and dihydroxydiphenylether, etc. Of those, there is most preferably employed a polycarbonate obtainable by an interfacial polycondensation of 2,2-bis-(4-hydroxyphenyl)propane in halogens and an aqueous alkali solution-methylenechloride system. Number average molecular weight in the polycarbonate resins is not particularly limited, and resins having a scope of 10,000–50,000 are preferred.

ABS-based resins are a graft copolymer in which 30–90 parts by weight of a monomer mixture composed of 40–80% by weight of aromatic vinyl monomers, 20–40% by weight of vinyl cyanate monomers, and 0–40% by weight of copolymerizable vinyl monomers is grafted on 10–70 parts by weight of a rubber-like polymer (total weight of the both is 100 parts), or a compatible mixture composed of the above-described graft copolymer and a styrene based copolymer not containing rubber-like polymers.

The rubber-like polymer which constitutes the ABS-based resins includes butadiene polymers, copolymers of butadiene with copolymerizable vinyl monomers, ethylene-propylene copolymers, ethylene-propylene-diene copolymers, and block copolymers of butadiene with aromatic vinyl monomers, etc. As the aromatic vinyl monomers, styrene and alpha-methylstyrene are particularly preferred.

As the vinyl cyanate monomers, there are exemplified acrylonitrile, methacrylonitrile, and alpha-chloroacrylonitrile, etc., and particularly acrylonitrile is preferred. Furthermore, as the copolymerizable vinyl monomers, there are exemplified methacrylates such as methyl methacrylate and ethyl methacrylate, etc., and vinyl carboxylic monomers such as acrylic acid and methacrylic acid, etc.

The ABS-based resins are prepared by the polymerization of 30–90 parts by weight of the monomer mixture composed of 40–80% by weight of the aromatic vinyl monomers, 20–40% by weight of the vinyl cyanate monomers and, optionally 0–40% by weight of the copolymerizable vinyl monomers in the presence of 10–70 parts by weight of the rubber-like polymer. In the preparation of the ABS-based resins, any publicly known polymerization techniques can be employed and, for example, there are exemplified a water-based heterogeneous polymerization such as a suspension polymerization and an emulsion polymerization, a bulk polymerization, a solution polymerization, a sedimentation polymerization in which a resulting polymer does not dissolve in solvents, and a combination thereof, etc.

As the metal salt of sulfonic acid (C) in the present invention, any publicly known metal salts can be employed and, specifically, there can be preferably employed sodium dodecylsulfonate, sodium dodecylbenzene sulfonate, potassium dodecylbenzene sulfonate, sodium dodecylbenzene naphthalene sulfonate, and a mixture thereof.

The permanently anti-electrostatic resin composition which is the fourth aspect of the present invention is a mixture composed of (A) 5–30 parts by weight of a lactone-modified polyvinyl alcohol, (B) 95–70 parts by weight of a thermoplastic resin, and (C) 0–5 parts by weight of a metal salt of sulfonic acid, and total of three components (A), (B), and (C) is 100 parts by weight.

In the case when (A) the lactone-modified polyvinyl alcohol is below 5 parts by weight or (B) the thermoplastic resin exceeds 95 parts by weight, the anti-electrostatic property does not sufficiently appear and, contrarily, in the case when (A) the lactone-modified polyvinyl alcohol exceeds below 30 parts by weight or (B) the thermoplastic resin is below 70 parts by weight, a mechanical strength and thermal stability in the resin composition unpreferably decrease.

The lactone-modified polyvinyl alcohol which is the component (A) is added in an amount of 5–30 parts by weight, preferably 7–25 parts by weight, more preferably 10–20 parts by weight.

The metal salt of sulfonic acid which is the component (C) may be mixed together with the lactone-modified polyvinyl alcohol which is the component (A) for the purpose of improving the anti-electrostatic property in a ratio of not exceeding 5 parts by weight based on the permanently anti-electrostatic resin composition of the present invention.

In the case when the above-described mixing amount exceeds 5 parts by weight, there considerably decrease mechanical strength and thermal stability in the permanently anti-electrostatic resin composition of the present invention, and when it is placed in a high moisture circumstance, there causes a problem such as changes in dimension, etc., resulting in being not preferred.

In the present invention, there are not limited at all methods or period for mixing the lactone-modified polyvinyl alcohol which is the component (A) with the thermoplastic resin which is the component (B) and, optionally the metal salt of sulfonic acid which is the component (C).

Usually, there is employed a method for melt kneading using an extruder, a kneader, a roll, and a Banbury mixer, etc. There is also preferably employed a method for in advance mixing starting materials in the form of powder-state, pellet-state, and flake-state using a Henshel mixer, etc., in a stage prior to melt kneading.

The permanently anti-electrostatic resin composition which is the fourth aspect of the present invention includes the above-described essential components (A), (B), and (C), and other components can be added according to circumstances. As the other components, there are exemplified an anion-based, cation-based, or nonion-based anti-electrostatic agent except the metal salt of sulfonic acid which is Component (C), a flame-retardant, a plasticizer, a lubricant, an anti-oxidant, an ultraviolet absorbent, a photo-stabilizer, inorganic fillers such as calcium carbonate and clay, a reinforced material such as glass fiber and carbon fiber, pigments such as titanium oxide and carbon black, and dyes, etc.

As the above-described flame-retardant, there are employed a phosphorus-based compound such as tricresyl phosphate and tris(dichloro)propyl phosphate, a halogenated compound such as tetrabromobisphenol A (TBA), decabromodiphenylether, octabromodiphenylether, a brominated epoxy, a TBA polycarbonate oligomer, and a chlorinated paraffin, antimony trioxide, aluminum hydroxide, and zinc borate, etc.

The permanently anti-electrostatic resin composition which is the fourth aspect of the present invention can be molded without any problems as molded articles such as a variety of parts, sheets, films, and fibers by publicly known molding methods, and can provide products having a variety of excellent properties such as a permanently anti-electrostatic property and mechanical strength. Furthermore, the permanently anti electrostatic resin composition which is the fourth aspect of the present invention can be widely applied as resin materials having a low price in uses such as electric/electronic parts, office automation equipments, and connectors for blower pipes, in which there is required a permanently anti-electrostatic property, because of an excellent mechanical strength typified by impact strength and low surface resistivity values.

According to the fifth aspect of the present invention, there is provided a lactone-modified resin having hydroxyl groups characterized by being represented by General Formula (2) as described below

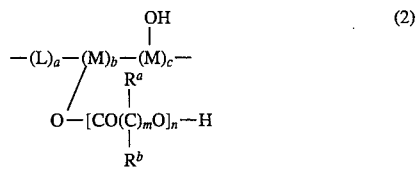

(2)

[in Formula (2), L is a any monomer structural unit not having hydroxyl groups or structural unit, M is a monomer residual group having hydroxyl groups in the molecule or structural unit, a, b, c, and n represent an average polymerization degree in respective structural units, $0 \leq a \leq 1000$, $10 \leq b \leq 5000$, $0 \leq c \leq 1000$, $2 \leq n \leq 100$, and $R^a$ and $R^b$ are each an independent hydrogen atom or a methyl group, m is a natural number of 2–10, the respective structural units of a, b, and c pieces are randomly connected], which has a hydroxyl group mol number ranging from $1 \times 10^{-4}$ to $1 \times 10^{-2}$ mol per one molecule, hydroxyl group numbers ranging from 10 to 5,000 per one molecule, and a number average molecular weight ranging from 20,000 to 2,000,000.

According to the sixth aspect of the present invention, there is provided a process for the preparation of a lactone-modified resin having hydroxyl groups represented by the above-described General Formula (2), which comprises kneading while melting 100 parts by weight of a mixture (A+B) composed of (A) 0.1–30% by weight of a polymer represented by General Formula (3) having 105,000 hydroxyl groups in the molecule as described below

(3)

[in Formula (3), L is a any monomer structural unit not having hydroxyl groups, M is a monomer residual group having hydroxyl groups in the molecule, a and (b+c) represent an average polymerization degree, $0 \leq a \leq 1000$, $10 \leq b+c \leq 5000$, the respective structural units of a and (b+c) pieces are randomly connected] and (B) 99.9–70% by weight of a lactone monomer represented by General Formula (4) as described below

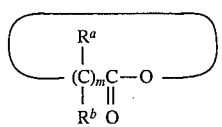

(4)

[in Formula (4), $R^a$ and $R^b$ are each an independent hydrogen atom or a methyl group, m is a natural number of 2–10] with 0.001–0.1 parts by weight of a polymerization catalyst.

In the polymer represented by the above-described General Formula (2) which is the fifth aspect of the present invention, the number of hydroxyl groups in the molecule is 10–5,000, and further a number average molecular weight is a scope of 20,0002,000,000.

Furthermore, the lactone-modified resin having hydroxyl groups which is the fifth aspect of the present invention can be prepared by the sixth aspect characterized by kneading while melting 100 parts by weight of a mixture (A+B) composed of (A) 0.1–30% by weight of a polymer having 10–5,000 hydroxyl groups in the molecule represented by General Formula (2) as described below and (B) 99.9–70% by weight of a lactone monomer represented by General Formula (3) as described below with 0.001–0.1 parts by weight of a polymerization catalyst.

The lactone-modified resin having hydroxyl groups which is the fifth aspect of the present invention can be prepared, for example, by using a polymer (A) represented by the above-described General Formula (2) and the lactone monomer (B) represented by the above-described General Formula (3) as starting materials.

The polymer (A) is a polymer having hydroxyl groups, and plays a function as an initiator when the lactone monomer (B) is polymerized.

It requires that Polymer (A) includes 10–5,000 hydroxyl groups in the molecule. In the case when hydroxyl groups are below 10, the number of hydroxyl groups is few, unpreferably resulting in that a reactivity is low when employed as adhesives, materials for curing, and coatings, etc.

Contrarily, in the case when it exceeds 5000 in the polymer, its preparation is unpractically difficult, resulting in being not preferred.

The number of hydroxyl groups in the molecule ranges preferably from 50 to 3,000, and more preferably from 100 to 2,000.

As specific examples of the above-described Polymer (A), there are exemplified an oligomer of a compound having a radically polymerizable double bond and hydroxyl groups in the molecule such as an ethyleneoxide-modified polyvinyl alcohol, a completely or partially saponified polyvinyl alcohol, and 2-hydroxyethyl(meth)acrylate, etc., a copolymer of the above-described compounds with other radically polymerizable monomers, a graft copolymer of the above-described compounds on various polymers, a hydrate of polydiene compounds, an ethyleneoxide-modified polyamide, an ethyleneoxide-modified polyphenol, an ethyleneoxide-modified polyvinyl alcohol, a polyvinyl acetal resin, a condensate having a high molecular weight of bisphenol A with epichlorohydrin which is referred to as a phenoxy resin, polysaccharide, starch, and celluloses, etc.

Of those, there are preferred a completely or partially saponified polyvinyl alcohol and a copolymer composed of 2-hydroxyethyl methacrylate and methylmethacrylate or styrene. The above-described hydroxyl groups in the molecule can be calculated by either theoretical values or values measured by a quantitative analysis method.

The quantitative analysis method, in which a sample is dissolved in a pyridine solution of phthalic anhydride and then heated in order to ring open phthalic anhydride by hydroxyl groups in the sample, is carried out by titration of carboxylic acids produced with a standard sodium aqueous solution.

The lactone monomer (B) represented by General Formula (3) is a lactone monomer described in the above-described aspects.

As specific examples of the lactone monomer (B), there are exemplified methylated lactones such as epsilon-caprolactone, 4-methylcaprolactone, etc., delta-valerolactone, beta-methyl-delta-valerolactone, beta-propiolactone, etc., and a mixture composed of two or more. Of those, epsilon-caprolactone which is industrially prepared is preferred.

The lactone-modified resin having hydroxyl groups which is the fifth aspect of the present invention can be prepared by the addition polymerization of the above-described polymer (A) with the lactone monomer (B) in the presence of a polymerization catalyst.

The polymerization catalyst to be employed herein is a catalyst for the ring-opening addition polymerization of lactone monomers.

Specifically, there are exemplified inorganic bases, inorganic acids, organic alkali metal catalysts, tin compounds, titanium compounds, aluminum compounds, zinc compounds, molybdenum compounds, and zirconium compounds, etc. Of those, there can be preferably employed tin compounds and titanium compounds from a viewpoint of a balance between easily handling, low toxicity, reactivity, coloringless properties, and thermal stability, etc.

As the tin compounds, there are exemplified monobutyltin compounds such as stannous chloride, stannous octylate, monobutyltin oxide, monobutyltin tris(2-ethylhexanate), etc., dibutyltin compounds such as dibutyltin oxide, etc. As titanium compounds, there are exemplified tetrabutyl titanate and tetraisopropyl titanate, etc. These may be solely or combinedly employed.

Mixing ratio of Polymer (A) to Lactone monomer (B) is a scope of 0.1–30% by weight of Polymer (A) based on 100 parts by weight of the total weight. In the case when the mixing ratio of the polymer (A) is below 0.1% by weight, the amount of hydroxyl groups is few, unpreferably resulting in losing a merit for employing as adhesives, materials for cured articles, and coatings, etc., and contrarily, in the case when it exceeds 30% by weight, properties as a lactone polymer, particularly, flexibility disappears, unpreferably resulting in losing a merit for employing as pressure-sensitive adhesives, adhesives, coatings, and plasticizers for polymers, etc. Mixing ratio of Polymer (A) is preferred in the above-described scope of 1–15% by weight and, particularly, most preferred in the scope of 2–10% by weight.

The addition amount of polymerization catalysts is 0.001–0.1 parts by weight based on 100 parts by weight of the total weight of both starting materials. In the case when the above-described amount of the catalyst is below 0.001 parts by weight, polymerization rate of the lactone monomers is slow and, contrarily, in the case when it exceeds 0.1 parts by weight, a lactone polymer obtained occasionally colors or its thermal stability occasionally decreases, resulting in being not preferred.

As the addition amount of catalysts, there is preferred 0.002–0.05 parts by weight in the above-described scope and, particularly, there is most preferred a scope of 0.005–0.01.

Polymerization temperature is generally a scope of 50°–250° C., in the case when it is below 50° C., a polymerization rate of the lactone monomers is slow and, contrarily, in the case when it exceeds 250° C., a thermal decomposition occurs in a lactone polymer, unpreferably resulting in being colored. As the polymerization temperature, there is preferred 100°–220° C. in the above-described scope and, particularly, there is most preferred a scope of 160°–200° C.

In order to prepare the lactone-modified resin having hydroxyl groups which is the fifth aspect of the present invention, the above-described two kinds of starting materials and polymerization catalysts are weighed in a fixed amount, and kneaded while melting. Kneading while melting means mixing the components while melting by heating.

As a mixer for kneading to be employed, there can be employed a melt kneader which is conventionally known without any limitations. Specifically, there are desirably employed a batch type kneader having blades for agitating, a kneader type mixer, a screw type kneader such as an extruder, etc., a static mixer type kneader, and a mixer having a structure in which those are connected in series.

In the case when the components are kneaded by the melt kneaders, the order for supplying starting materials and polymerization catalysts and methods for supplying are not limited at all, provided that it is preferred to adjust the water content in the starting materials and polymerization catalysts to below 0.5% by weight.

In the case when the water content in the starting materials and polymerization catalysts exceeds 0.5% by weight, there occurs addition-polymerization of lactone monomers by the water, unpreferably resulting in that lactone oligomers are produced and there is occasionally caused a difficulty in properties depending upon uses.

The water content in the starting materials and polymerization catalysts is most preferably below 0.05% by weight.

The lactone-modified resin having hydroxyl groups which is the fifth aspect of the present invention prepared by the above-described processes possesses the structure represented by the above-described General Formula (1). That is, L and M in the formula represent a variety of residual units derived from Polymer (A) which is the above-described starting material. That is, L in the formula is a structural unit of voluntary monomers not containing hydroxyl groups or a voluntary structural unit not containing hydroxyl groups, which is not always one.

As the specific examples, there are exemplified a structural unit of an aromatic monomer such as styrene, methylmethacrylate, acrylonitrile, a structural unit of an acryl-based monomer such as acrylic acid, etc., a structural unit of a diene monomer such as butadiene, a structural unit of a vinyl monomer such as vinyl acetate and vinyl chloride, etc., a structural unit of an olefinic monomer such as ethylene, etc., a structural unit of an acetalized vinyl alcohol monomer, and a structural unit of phenylene oxide, etc.

Furthermore, M in the formula represents a residual group of monomers containing hydroxyl groups in the molecule or a structural unit of monomers containing hydroxyl groups, which is not always one. Specifically, there are exemplified a residual group of vinyl alcohol produced by the saponification of vinyl acetate, the residual group of 2-hydroxyethyl(meth)acrylate monomer, the residual group of 2-hydroxypropyl(meth)acrylate monomer, the residual group of 4-hydroxybutyl(meth)acrylate monomer, the residual group of 6-hydroxyhexyl(meth)acrylate monomer, the residual group of 4-hydroxybutyl vinylether monomer, a residual group of reaction product between epichlorohydrin and bisphenol A, and a residual group of a reaction product of ethyleneoxide, etc. Still further, a combination of L with M represents a variety of other residual groups derived from the polymer (A) which is the starting material. It is to be noted that a, b, c, and n represent respective average polymerization degree, and those are defined by a scope of $0 \leq a \leq 1,000$, $10 \leq b \leq 5,000$, $0 \leq c \leq 1,000$, and $2 \leq n \leq 100$, respectively.

The above-described scopes are adjusted on the premise that hydroxyl group mol numbers per 1 g of the resin, hydroxyl group numbers in a molecule, and a number average molecular weight are included within the scope defined in the present invention. In the case when the polymer (A) having 10–5,000 hydroxyl groups in the molecule, which is an initiator in the lactone-modified resin having many hydroxyl groups of the present invention, is a completely or partially saponified polyvinyl alcohol, and the respective scope of a, b, c, and n is $0 \leq a \leq 500$, $100 \leq b \leq 5,000$, $0 \leq c \leq 2,000$, and $2 \leq n \leq 100$ in the above-described scopes defined.

Furthermore, the lactone-modified resin having hydroxyl groups which is the fifth aspect of the present invention prepared by the above-described processes requires that the mol number of hydroxyl groups per 1 g of the resin ranges in a scope of $1 \times 10^{-4}$–$1 \times 10^{-2}$, the number of hydroxyl groups in a molecule ranges in a scope of 10–5,000 pieces, and a number average molecular weight ranges in a scope of 20,000–2,000,000.

Still further, M in the formula represents a residual group of a monomer not containing hydroxyl groups or a structural unit containing hydroxyl groups, which is not always one kind. Specifically, there are exemplified a residual group of vinyl alcohol monomer produced by the saponification of vinyl acetate, the residual group of 2-hydroxyethyl(meth)acrylate monomer, the residual group of 2-hydroxypropyl(meth)acrylate monomer, the residual group of 2-hydroxybutyl(meth)acrylate monomer, the residual group of 6-hydroxyhexyl(meth)acrylate monomer, the residual group of 4-hydroxybutyl vinylether monomer, a residual group of a reaction product between epichlorohydrin and bisphenol A, and a residual group of a reaction product of ethyleneoxide, etc. Still further, combined L and M represent a variety of other residual groups derived from Polymer (A) which is the above-described starting material. It is to be noted that a, b, c, and n in the formula represent respective an average polymerization degree, and those are defined by a scope of $0 \leq a \leq 1,000$, $10 \leq b \leq 5,000$, $0 \leq c \leq 1,000$, and $2 \leq n \leq 100$, respectively.

The above-described scopes are adjusted on the premise that the mol number of hydroxyl group per 1 g of the resin, the number of hydroxyl group in a molecule, and a number average molecular weight are included within the scope defined in the present invention. In the case when the polymer (A) having 10–5,000 hydroxyl groups in the molecule, which is an initiator in the lactone-modified resin having many hydroxyl groups of the present invention, is a completely or partially saponified polyvinyl alcohol, and the respective scope of a, b, c, and n is $0 \leq a \leq 500$, $100 \leq b \leq 5,000$, $0 \leq c \leq 2,000$, and $2 \leq n \leq 100$ in the above-described scopes defined, respectively.

Furthermore, the lactone-modified resin having hydroxyl groups which is the fifth aspect of the present invention prepared by the above-described processes requires that the mol number of hydroxyl groups per 1 g of the resin ranges in a scope of $1 \times 10^{-4}$–$1 \times 10^{-2}$, the number of hydroxyl groups in a molecule ranges in a scope of 10–5,000 pieces, and a number average molecular weight ranges in a scope of 20,000–2,000,000.

In the case when the mol number of hydroxyl groups per 1 g of the lactone-modified resin having hydroxyl groups which is the fifth aspect of the present invention is below $1 \times 10^{-4}$ mol, the amount of hydroxyl groups is few, unpreferably resulting in losing a merit in the use for adhesives, materials for cured articles, and coatings, etc. Contrarily, in the case when it exceeds $1 \times 10^{-2}$ mol, a property as polymers, particularly, flexibility disappears, unpreferably resulting in losing a merit in the use for pressure-sensitive adhesives, coatings, and plasticizers for polymers, etc.

The mol number of hydroxyl groups per 1 g of the resin ranges in the above-described scope, preferably $5 \times 10^{-4}$–$5 \times 10^{-3}$ mol, and particularly $8 \times 10^{-4}$–$3 \times 10^{-3}$ mol.

The mol number of hydroxyl group per 1 g of the resin can be calculated by either theoretical values or values measured by a quantitative analysis method. The quantitative analysis method, in which a sample is dissolved in a pyridine solution of phthalic anhydride and then heated in order to ring open phthalic anhydride by hydroxyl groups in the sample, is carried out by titration of carboxylic acids generated with a standard sodium aqueous solution.

The number of hydroxyl groups per 1 molecule of the lactone-modified resin having hydroxyl groups which is the fifth aspect of the present invention is 10–5,000 which basically equals to the number of hydroxyl groups in an initiator [Polymer (A) having hydroxyl groups in the molecule] to be employed.

The lactone-modified resin having hydroxyl groups which is the fifth aspect of the present invention has a number average molecular weight of 20,000–2,000,000. In the case when the number average molecular weight is below 20,000, there are not balanced the amount of hydroxyl groups and the amount of lactone monomers to be added, resulting in that the amount of hydroxyl groups decreases, otherwise, a property as lactone polymers, particularly, flexibility unpreferably disappears. Contrarily, in the case when it exceeds 2,000,000, viscosity excessively increases, unpreferably resulting that there causes a problem of a decline in moldability, etc.

In the above-described scope of number average molecular weight, 50,000–1,000,000 is preferred and, particularly, a scope of 100,000–500,000 is preferred.

The number average molecular weight is measured by a gel permeation chromatography (GPC) method, and there is preferably employed the number average molecular weight based on a standard polystyrene which is convenient.

The lactone-modified resin having hydroxyl groups which is the fifth aspect of the present invention exhibits a variety of form such as a colorless and transparent liquid, transparent high viscous liquid, waxy solid, and a white-colored solid like a crystal, etc., depending upon the number of lactone component chains and the polymerization degree. It is desirable to adjust the form by controlling a composition such as the number of hydroxyl groups in Polymer (A) having hydroxyl groups in the molecule, structure, molecular weight, and the composition ratio of the above-described Polymer (A) to lactone monomers (B).

Furthermore, the lactone polymer having a high hydroxyl value according to the present invention can be also used without any problems by mixing with any additives such as organic solvents, polymerizable monomers, curing agents, catalysts, and stabilizers, etc., depending upon uses. Still further, depending upon uses, hydroxyl groups can be completely or partially modified by the addition of an acid anhydride such as acetic anhydride and succinic anhydride, etc., a modifier for hydroxyl groups such as epichlorohydrin, (meth)acrylic acid, methyl(meth)acrylate, glycidyl(meth)acrylate, diketene, hexamethyldisilazane, etc., in an appropriate amount.

The lactone-modified resin having hydroxyl groups which is the fifth aspect of the present invention is multi-branched, which is a polymer having a high hydroxyl value, and which is excellent in a balance between the mol number of hydroxyl groups per the unit weight, the number of hydroxyl groups per the unit molecule, and number average molecular weight.

Therefore, it can be widely used as pressure-sensitive adhesives, adhesives, materials for curing, thickening agents, lubricating oils, plasticizers for polymers, coatings, a variety of binders, biodegradable materials, and materials for medical treatments, etc.

Although the present invention is illustrated in more detail by Examples described below, the present invention is not limited by the Examples alone.

EXAMPLE 1

Figure 2A:
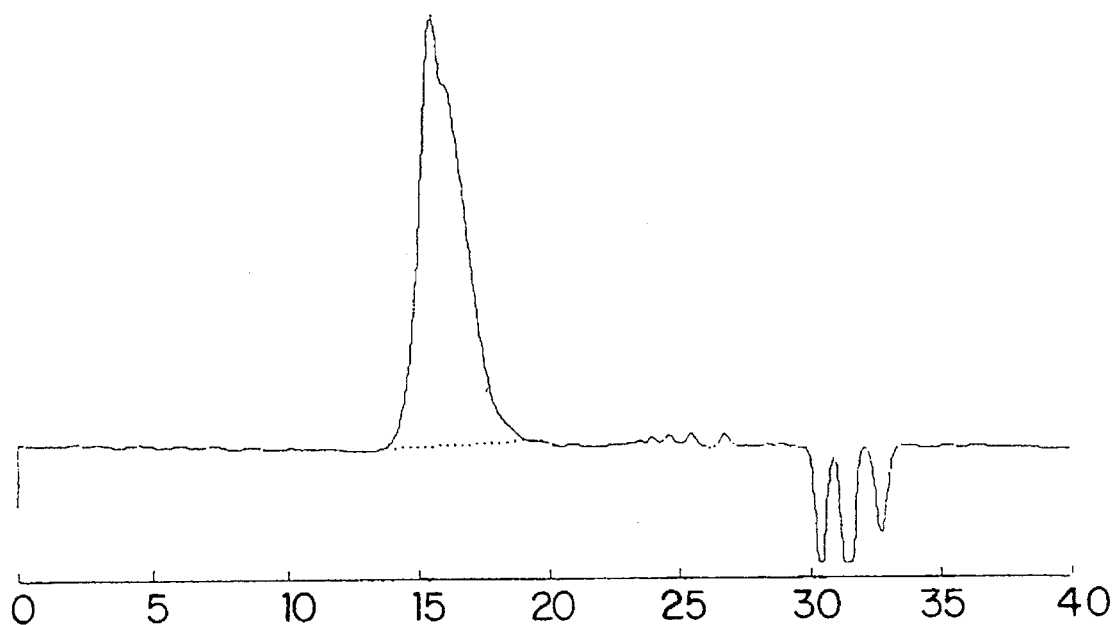
FIG. 2(A) and FIG. 2(B) are respective GPC chart related to the lactone-modified polyvinyl alcohol obtained in Examples 1 and 2.

A 1-liter glass-made flask was charged with 300 g of a polyvinyl alcohol PVA-117 [a saponification degree of 98.5±0.5 and a polymerization degree of 1700] manufactured by Kuraray, Ltd., 720 g of epsilon-caprolactone, followed by distilling out 20 g of epsilon-caprolactone to adjust water contents in starting materials to 0.01% by weight in the conditions of 100° C. and 2 mmHg. Successively, 0.02 g of stannous chloride was added as a polymerization catalyst, followed by raising the temperature to 180° C. and kneading while melting for 5 hours to obtain a lactone-modified polyvinyl alcohol containing the remained epsilon-caprolactone of 0.35%. This was a colorless and transparent solid like clay, which has a number average molecular weight of 162,000 based on a standard polystyrene measured by GPC. FIG. 1 is an $^1$H-NMR chart, and FIG. 2(A) is a GPC chart in relation to the solid.

It was confirmed by analysis of the $^1$H-NMR chart which is the FIG. 1 that x, y, z, and n values in General Formula (1) in relation to the solid are approximately 55, 0, 45, and 2.0, respectively. The polymer obtained is designated as LMPA-1.

EXAMPLE 2

Figure 2B:
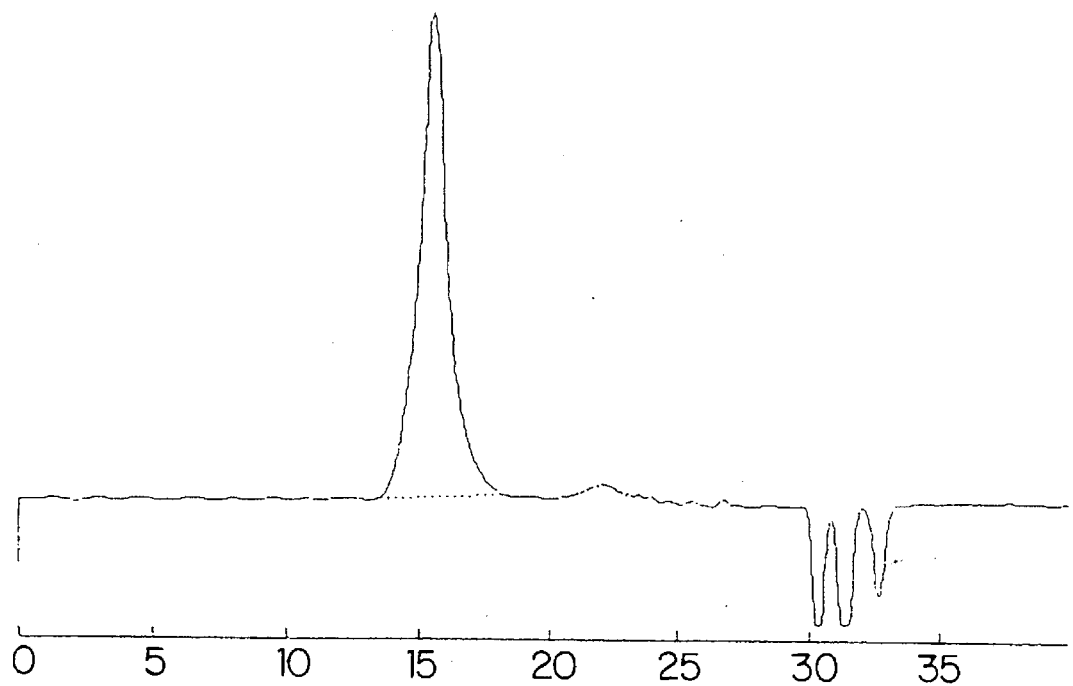

The quite same process for the preparation was followed as in Example 1 except that 100 g of the polyvinyl alcohol and 920 g of epsilon-caprolactone were employed to prepare a lactone-modified polyvinyl alcohol containing unreacted epsiloncaprolactone of 0.32%. This was a colorless and high viscous liquid having transparency, which has a number average molecular weight of 339,000 based on a standard polystyrene measured by GPC. FIG. 2(B) is a GPC chart, and FIG. 3 is an $^1$H-NMR chart in relation to this.

Figure 3:
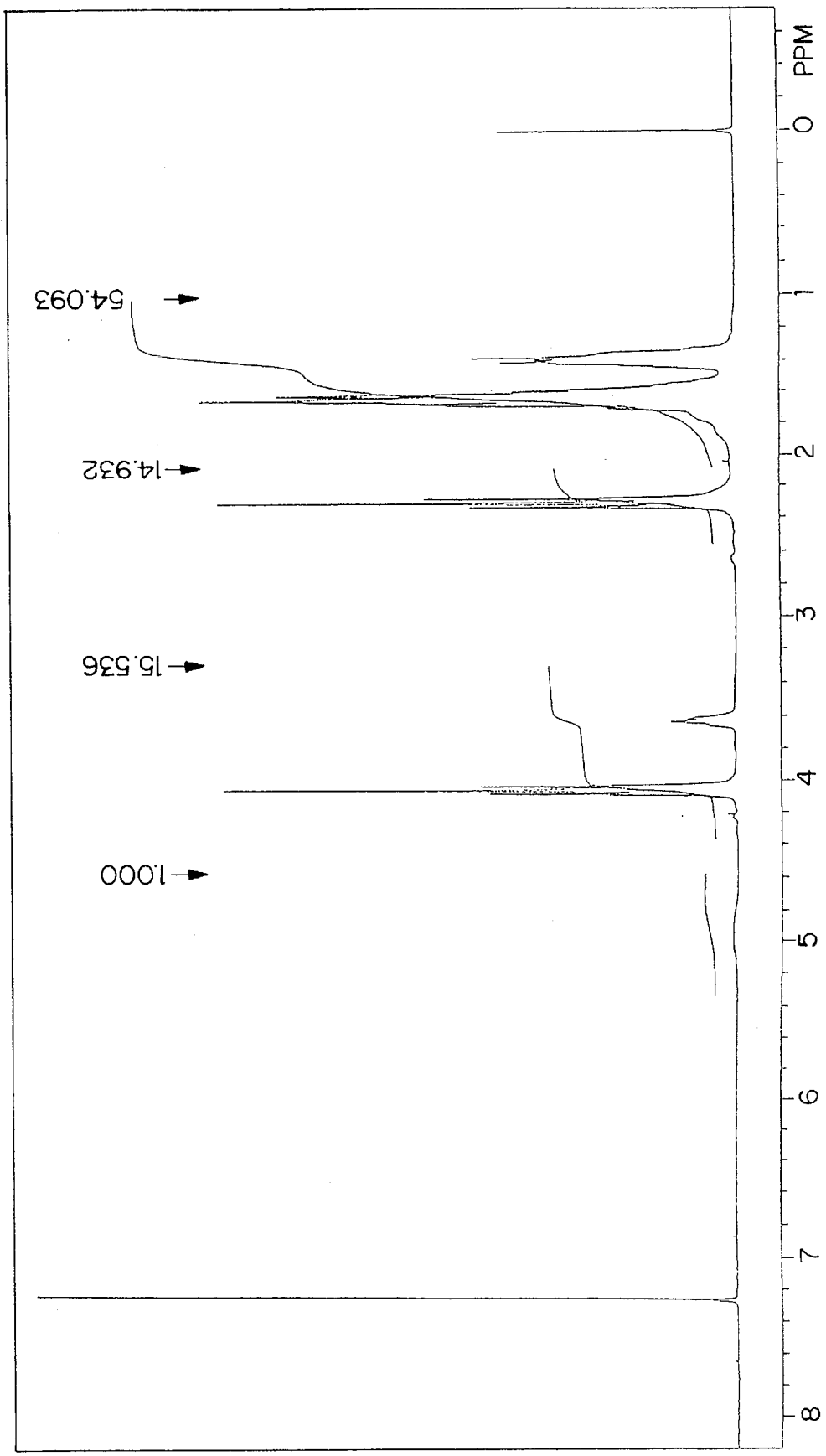
FIG. 3 is an $^1$H-NMR chart related to the lactone-modified polyvinyl alcohol obtained in Example 2.

It was confirmed by analysis of the $^1$H-NMR chart which is FIG. 3 that x, y, z, and n values in General Formula (1) in relation to the solid are approximately 30, 0, 70, and 5, respectively. The polymer obtained is designated as LMPVA-2.

EXAMPLE 3

A 1-liter glass-made flask was charged with 400 g of a polyvinyl alcohol PVA-203 manufactured by Kuraray, Ltd. [a saponification degree of 88.5×1.0 and a polymerization degree of 300], 400 g of epsilon-caprolactone, and 0.02 g of stannous chloride which is a polymerization catalyst, followed by raising the temperature to 180° C. and kneading while melting for 5 hours to obtain a lactone-modified polyvinyl alcohol including unreacted epsilon-caprolactone of 0.24%. This was a colorless and very flexible solid having transparency. The polymer obtained is designated as LMPVA-3.

Although the solid was low water-soluble, when 0.5 g of the solid was immersed in 100 ml of water at 20° C. for 30 days, it was almost dissolved.

Figure 4:
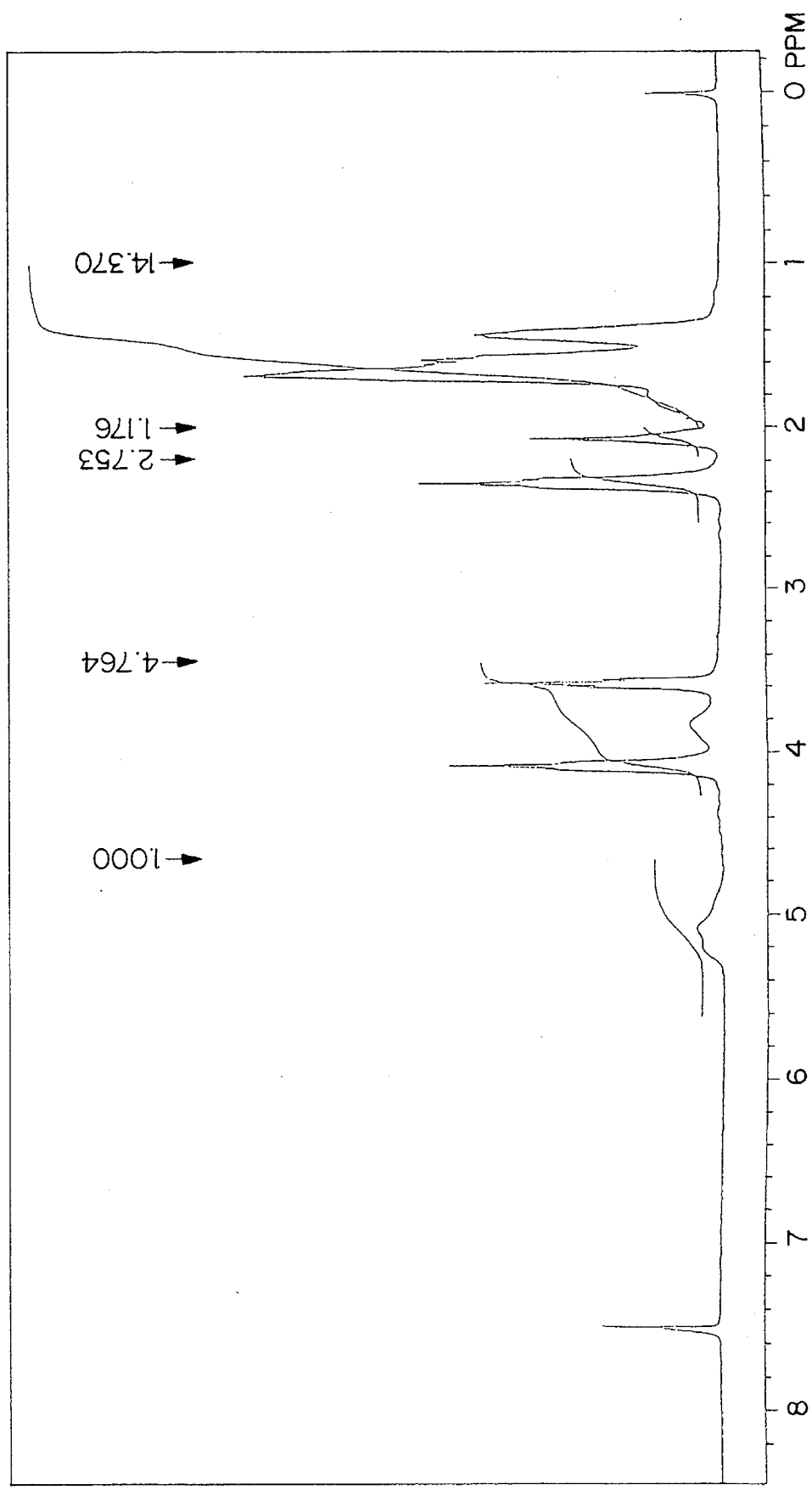
FIG. 4 is an $^1$H-NMR chart related to the lactone-modified polyvinyl alcohol obtained in Example 4.

Furthermore, a melt viscosity of the solid was 135 poise at 160° C. which was measured with a melt flow-tester in the conditions of passing through the orifice having the diameter of 1 mm and the length of 1 cm under a load of 10 kg/cm$^2$. FIG. 4 is an $^1$H-NMR chart obtained using a solvent mixture composed of $CD_3OD/CDCl_3$. It was confirmed by analysis of the chart that x, y, z, and n values in General Formula (1) in relation to the solid are approximately 66, 12, 22, and 1.8, respectively.

EXAMPLE 4

A Labo-plastomil mixer manufactured by Toyo Seki, Ltd., was charged with 35 g of a polyvinyl alcohol PVA-117 [a saponification degree of 98.±0.5 and polymerization degree of 1700] manufactured by Kuraray, Ltd., 15 g of epsilon-caprolactone monomer, and 0.02 g of monobutyltin tris (2-ethylhexanate) which is a polymerization catalyst, followed by heating to 180° C. and kneading while melting for 10 minutes to obtain a lactone-modified polyvinyl alcohol containing the remained epsilon-caprolactone of 0.85%. This was a colorless and transparent solid which is very flexible.

When 1 g of the solid was immersed in 100 ml of water at 20° C. for 10 hours, it was completely dissolved.

Furthermore, a melt viscosity of the solid was 9600 poise at 220° C. which was measured with a melt flow-tester in the conditions of passing through the orifice having the diameter of 1 mm and the length of 1 cm under a load of 10 kg/cm$^2$. It was confirmed that x, y, z, and n values in General Formula (1) in relation to the solid are approximately 87, 0, 13, and 1.3, respectively.

The polymer obtained is designated as LMPVA-4.

EXAMPLE 5

A Labo-plastomil mixer manufactured by Toyo Seiki, Ltd., was charged with 40 g of a polyvinyl alcohol PVA-103 [a saponification degree of 98.±0.5 and polymerization degree of 300] manufactured by Kuraray, Ltd., 10 g of epsilon-caprolactone monomer, and 0.02 g of monobutyltin tris (2-ethylhexanate ) which is a polymerization catalyst, followed by heating to 180° C. and kneading while melting for 10 minutes to obtain a lactone-modified polyvinyl alcohol containing the remained epsilon-caprolactone of 0.41%. This was a colorless and transparent solid which is very flexible.

Figure 5:
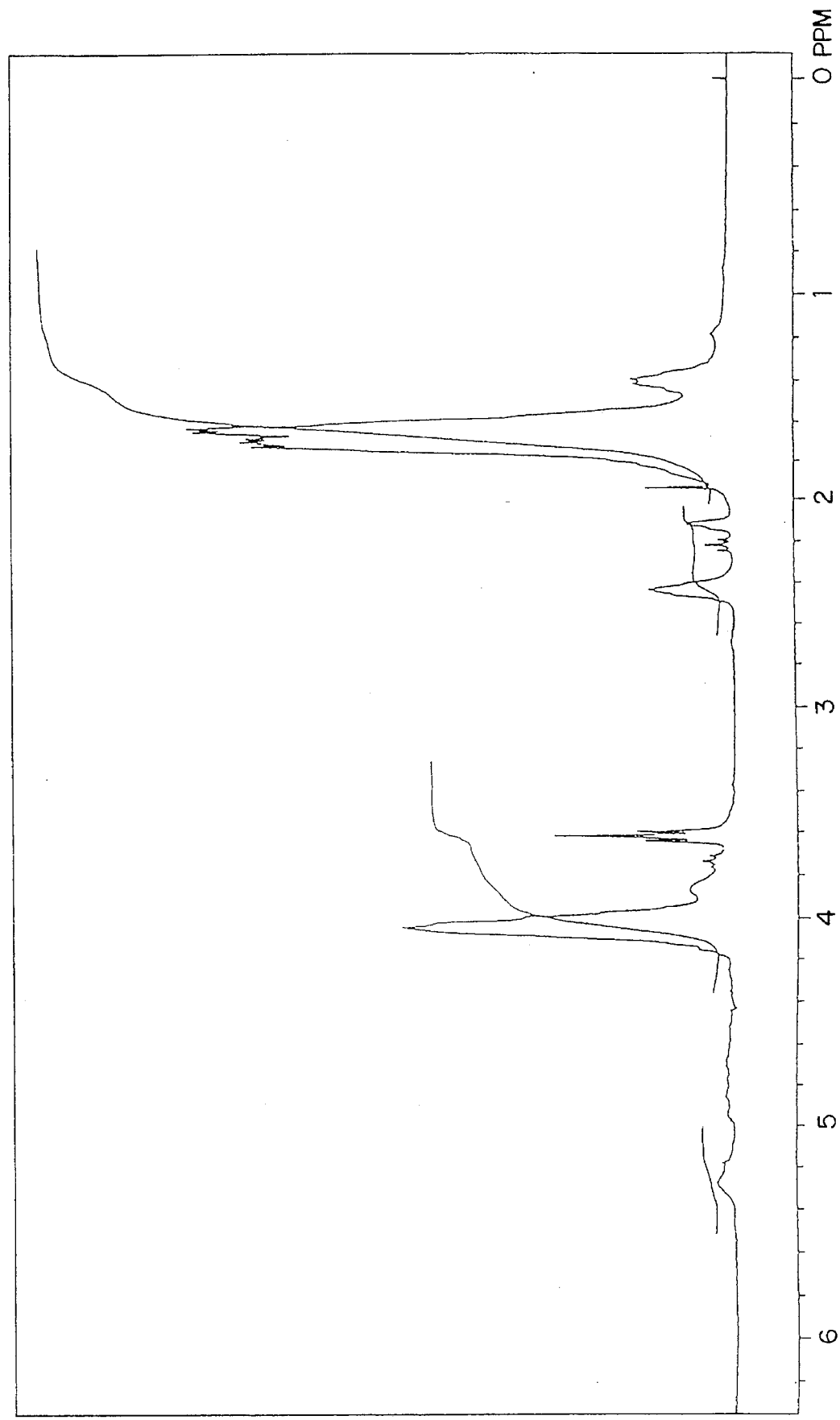
FIG. 5 is an $^1$H-NMR chart related to the lactone-modified polyvinyl alcohol obtained in Example 5.

When 1 g of the solid was immersed in 100 ml of water at 20° C. for 30 minutes, it was dissolved. Furthermore, melt viscosity of the solid was 1370 poise at 200° C. which was measured with a melt flow-tester under the conditions of passing through the orifice having the diameter of 1 mm and length of 1 cm under a load of 10 kg/cm$^2$. It was confirmed by an analysis of $^1$H-NMR chart with $D_2O$ shown in FIG. 5 that x, y, z, and n values in General Formula (1) in relation to the solid are approximately 92, 0, 8, and 1.2, respectively. The polymer obtained is designated as LMPVA-5.

EXAMPLE 6

A 1-liter glass-made flask was charged with 100 g of a polyvinyl alcohol PVA-403 [a saponification degree of 81.5±1.5 and a polymerization degree of 300] manufactured by Kuraray, Ltd. , 900 g of epsilon-caprolactone monomer, and 0.05 g of monobutyltin tris(2-ethylhexanate) which is a polymerization catalyst, followed by heating to 160° C. and kneading while melting for 3 hours. It was confirmed that x, y, z, and n values in General Formula (1) in relation to the solid are approximately 14, 20, 66, and 6.2, respectively. The polymer obtained is designated as LMPVA-6.

EXAMPLES 7 to 9

According to the ratio described in Table 1, there were kneaded while melting a polyvinyl acetal [Eslek BX-3Z] manufactured by Sekisui Kagaku, Ltd., and the lactone-modified polyvinyl alcohol LMPVA-1 obtained in Example 1 at 180° C. for 5 minutes with a Labo-plastomil mixer manufactured by Toyo Seiki, Ltd. All of resin compositions obtained were transparent. Furthermore, melt viscosity in relation to the resin compositions was measured with a capillary type rheometer, and the results are shown in Table 1.

EXAMPLES 10 and 11

According to the ratio described in Table 2, there were kneaded while melting a polyoxymethylene copolymer, Duracon M90-01 manufactured by Polyplastics, Ltd., and the lactone-modified polyvinyl alcohol LMPVA-1 obtained in Example 1 at 180° C. for 5 minutes with a Labo-plastomil mixer manufactured by Toyo Seiki, Ltd. Melt viscosity in relation to the resin compositions obtained was similarly measured to application example 1, and the results are shown in Table 2.

EXAMPLES 12 and 13

According to the ratio described in Table 3, there were kneaded while melting the polyvinyl alcohol PVA-117 manufactured by Kuraray, Ltd., and the lactone-modified polyvinyl alcohol LMPVA-3 obtained in Example 3 at 180° C. for 5 minutes with a Laboplastomil mixer manufactured by Toyo Seiki, Ltd. All of resin compositions obtained were transparent. Melt viscosity in relation to the resin compositions obtained was measured, and results are described together in Table 3.

EXAMPLE 14

There were kneaded while melting 30 g of the polyvinyl acetal [Eslek BX-3Z] manufactured by Sekisui Kagaku, Ltd., 2 g of the polyvinyl alcohol [PVA-103] manufactured by Kuraray, Ltd., 18 g of epsilon-caprolactone monomer, and 0.02 g of monobutyltin tris(2-ethylhexanate) which is a polymerization catalyst at 180° C. for 10 minutes with a Labo-plastomil mixer manufactured by Toyo Seiki, Ltd., to obtain transparent resin compositions. Melt viscosity in relation to the resin compositions obtained was measured with a capillary type rheometer, and results are shown in Table 4.

EXAMPLES 15 to 17

According to the ratio described in Table-4, there were kneaded while melting a polyvinyl acetal [Eslek BX-3Z] manufactured by Sekisui Kagaku, Ltd., and the lactone-modified polyvinyl alcohol LMPVA-6 obtained in Example 6 at 180° C. for 5 minutes with a Labo-plastomil mixer manufactured by Toyo Seiki, Ltd. All of the resin compositions obtained were transparent. Furthermore, melt viscosity in relation to the resin compositions was measured with a capillary type rheometer, and the results are shown in Table 4.

Comparative Examples 1 to 3

For references, there was measured melt viscosity in relation to the polyvinyl acetal, polyoxynethylene copolymer, and polyvinyl alcohol employed in Examples 7 to 17 with a capillary type rheometer, and the results are described together in Tables 1–3.

TABLE 1

| Composition- | Example | | | Comparative Example |
|---|---|---|---|---|
| Viscosity | 7 | 8 | 9 | 1 |
| PV-ACETAL | 90 | 75 | 50 | 100 |
| LMPVA-1 | 10 | 25 | 50 | 0 |
| Melt Viscosity (poise) | 12100 | 6800 | 1500 | 16900 |

In the Table 1, PV-ACETAL is the polyvinyl acetal, and LMPVA-1 is the lactone-modified polyvinyl alcohol prepared in Example 1.

TABLE 2

| Composition- | Example | | Comparative Example |
|---|---|---|---|
| Viscosity | 10 | 11 | 2 |
| POLYOXYMETHYLENE | 70 | 50 | 100 |
| LMPVA-1 | 30 | 50 | 0 |
| Melt Viscosity (poise) | 1400 | 500 | 3300 |

In the Table 2, LMPVA-1 is the lactone-modified polyvinyl alcohol prepared in Example 1.

TABLE 3

| Composition- | Example | | Comparative Example |
|---|---|---|---|
| Viscosity | 12 | 13 | 3 |
| PVA-117 | 70 | 50 | 100 |
| LMPVA-3 | 30 | 50 | 0 |
| Melt Viscosity (poise) | 1400 | 500 | 3300 |

In the Table 3, LMPVA-3 is the lactone-modified polyvinyl alcohol prepared in Example 3.

TABLE 4

| Composition- | Example | | | |
|---|---|---|---|---|
| Viscosity | 14 | 15 | 16 | 17 |
| PV-ACETAL | — | 90 | 80 | 70 |
| LMPVA-6 | — | 10 | 20 | 30 |
| Melt Viscosity (poise) | 320 | 7900 | 1200 | 360 |

In the Table 4, PV-ACETAL is the polyvinyl acetal, and LMPVA-6 is the lactone-modified polyvinyl alcohol prepared in Example 6.

EXAMPLE 18

A 1-liter glass-made flask was charged with 500 g of a polyvinyl alcohol PVA-105 [a saponification degree of 98.5±0.5 and a polymerization degree of 500] manufactured by Kuraray, Ltd., 500 g of epsilon-caprolactone, and 0.02 g of monobutyltin oxide, followed by raising the temperature to 180° C. and kneading while melting for 5 hours, and epsilon-caprolactone of 0.18% was remained in a lactone-modified polyvinyl alcohol obtained. This was a slightly yellow-colored solid having transparency, which had a number average molecular weight of 48,000 based on a standard polystyrene measured by GPC. It was confirmed by analysis of an $^1$H-NMR chart that x, y, z, and n values in General Formula (1) in relation to the solid are approximately 74, 0, 26, and 1.5, respectively. The lactone-modified polyvinyl alcohol obtained is designated as LMPVA-18.

EXAMPLE 19

There were dry blended LMPVA-1 obtained in Example 1 as a lactone-modified polyvinyl alcohol which is the component (A) and an ABS resin [Cevian 510 manufactured by Daicel Chemical Industries, Ltd., in the following, referred to as ABS-V] as a thermoplastic resin which is the component (B) together with respective 0.1 part by weight of an anti-oxidant and a slipping agent according to the mixing ratio shown in Table-5, with a V-shaped blender for 20 minutes.

The resin blended was extruded while kneading at 230° C. with a single screw extruder having 40 mm phi manufactured by Osaka Seiki, Ltd. On extruding, venting up and surging were not observed. Strands extruded were pelletized while cooling in a water bath. After dried in a hot-air circulation type dryer at 90° C. for 4 hours, pellets were molded with an injection machine, TS-100 type manufactured by Nissei Jushi Industries, Ltd., to mold test pieces for evaluation of properties.

Injection molding was carried out in the conditions of cylinder temperature of 230° C., mold temperature of 55° C., and molding cycle of injection of 15 seconds and cooling of 30 seconds.

Test pieces were ASTM dumb-bells (#2) for a tensile test, ¼" bars for a bending test and an Izod impact test, and color plates for measuring surface resistivity. Of the test pieces molded, properties in relation to ASTM dumb-bells and ¼" bars were evaluated after those were placed in a air-conditioned room maintained at 23° C. and 50% RH for one overnight. Furthermore, surface resistivity at the period of 1 hour after molding was measured in relation to the color plates, and then surface resistivity was measured again after placed in an air-conditioned room for 30 days. Values of thus-measured surface resistivity and properties, etc. are shown in Table 1. As results, surface resistivity immediately after molding is $5\times10^{-12}$ ohm, and that after 30 days is $3\times10^{12}$, which are approximately same values. Also, the values were not changed even after water washing. Bending elasticity and Izod impact strength in the composition are high, outer appearance in the molded pieces and workability in extruding were also satisfactory.

EXAMPLE 20

Same operations as in Example 19 were followed except that mixing amount of LMPVA-1 was changed to 20% by weight. The results are shown in Table 5. Surface resistivity becomes low, and durability of anti-electrostatic property was not changed as well as in Example 19.

EXAMPLES 21 and 22

There were employed resins containing the respective lactone-modified polyvinyl alcohols in respective mixing ratio as shown in Table 5. The mixing amount of the respective lactone-modified polyvinyl alcohol was 10% by weight also in Examples 21 and 22 as well as Example 19, and same operations were followed as in Example 19.

In the case (Example 21) when LMPVA-2 prepared in Example 2 was employed, Izod impact strength is excellent, and in the case (Example 22) when LMPVA-18 was employed, anti-electrostatic property is particularly excellent.

TABLE 5

| Resin (parts by weight) | Example 1 | 2 | 3 | 4 |
|---|---|---|---|---|
| A | 90 | 80 | 90 | 90 |
| B | 10 | 20 | | |
| C | | | 10 | |
| D | | | | 10 |
| Item | | | | |
| L | 15 | 13 | 18 | 14 |
| M | 21000 | 20000 | 19000 | 19000 |
| N | 400 | 370 | 370 | 360 |
| O | $5 \times 10^{12}$ | $1 \times 10^{12}$ | $7 \times 10^{12}$ | $3 \times 10^{12}$ |
| P | $3 \times 10^{12}$ | $8 \times 10^{12}$ | $6 \times 10^{12}$ | $1 \times 10^{12}$ |
| Other appearance | ○ | ○ | ○ | ○ |

In the Table 5, the abbreviations are as follows.
A: ABS-V
B: Lactone-modified polyvinyl alcohol/LMPVA-1
C: Lactone-modified polyvinyl alcohol/LMPVA-2
D: Lactone-modified polyvinyl alcohol/LMPVA-18
L: Izod Impact strength (kg-cm/cm)
M: Bending Elasticity (kg/cm$^2$)
N: Tensile Strength (kg/cm$^2$)
O: Surface resistivity at 1 hour after molded (ohm)
P: Surface resistivity at 30 days after molded (ohm)

Comparative Examples 4 and 5

In the Examples, there were employed polymers which do not contain a polyvinyl alcohol and a lactone, respectively, which are essential components in the component (A) lactone-modified polyvinyl alcohol, that is, a polycaprolactone [PCL-H having a number average molecular weight of 100,000 manufactured by Daicel Chemical Industries, Ltd.] and a polyvinyl alcohol [PVA-117 having saponification degree of 98.5±0.5 and polymerization degree of 1,700 manufactured by Kuraray, Ltd.].

The results are shown in Table-6. In the case of Comparative Example 4, surface resistivity is high and anti-electrostatic property does not appear. In the case of Comparative Example 5, durability in anti-electrostatic property does not appear and surface resistivity increases by water washing. Furthermore, compatibility with the ABS resin is poor and Izod impact strength considerably decreases.

Comparative Examples 6 to 8

In the Examples, there were employed an anti-electrostatic agent, a polyethylene glycol (PEG), a polyethylene glycol/polypropylene glycol copolymer (PEG/PPG), and dodecylbenzene sodium sulfonate (DBS), which are commercially sold. The results are shown in Table 6. In Comparative Example 6, surface resistivity is high and anti-electrostatic property does not appear. In Comparative Example 7, durability in anti-electrostatic property does not appear and also Izod impact strength considerably decreases. Furthermore, in Comparative Example 8, silver strings were observed at the surfaces of molded pieces, and it seems that those were produced by gases derived from the anti-electrostatic agent. Outer appearance was also bad.

Comparative Examples 9 and 10

In Comparative Example 9, there was employed 50% by weight of LMPVA-1 as the component (A) which is a lactone-modified polyvinyl alcohol.

The results are shown in Table 6. In Comparative Example 9, Izod impact strength and bending elasticity were low, outer appearance was bad, and extruding workability was also problematic. Furthermore, in Comparative Example 10, there was employed 2% by weight of LMPVA-2.

Surface resistivity was low because an addition amount of the lactone-modified polyvinyl alcohol is few, and anti-electrostatic effect did not appear.

Table 7. Those are excellent in bending elasticity, low in surface resistivity, and excellent in anti-electrostatic property and outer appearance.

Comparative Examples 11 and 12

Same operations as in Example 19 were followed except that a polyvinyl alcohol was mixed with PBT and PC. As shown in Table 7, outer appearance in the products was not good.

TABLE 7

| Resin (parts by weight) | Example | | Comparative Example | |
|---|---|---|---|---|
| | 23 | 24 | 11 | 12 |
| J | 90 | | 90 | |
| K | | 90 | | 90 |
| B | 10 | 10 | | |

TABLE 6

| Resin (parts by weight) | Comparative Example | | | | | | |
|---|---|---|---|---|---|---|---|
| | 4 | 5 | 6 | 7 | 8 | 9 | 10 |
| A | 90 | 90 | 90 | 90 | 98 | 50 | 98 |
| B | | | | | | 50 | 2 |
| E | 10 | | | | | | |
| F | | 10 | | | | | |
| G | | | 10 | | | | |
| H | | | | 10 | | | |
| I | | 10 | | | 2 | | |
| Item | | | | | | | |
| L | 18 | 9 | 8 | 20 | 19 | 10 | 19 |
| M | 20000 | 25000 | 23000 | 18000 | 24000 | 13000 | 23000 |
| N | 400 | 430 | 420 | 360 | 450 | 300 | 430 |
| O | $5 \times 10^{16}$ | $8 \times 10^{12}$ | $4 \times 10^{14}$ | $6 \times 10^{12}$ | $3 \times 10^{12}$ | $2 \times 10^{11}$ | $4 \times 10^{14}$ |
| P | $4 \times 10^{16}$ | $8 \times 10^{10}$ | $5 \times 10^{13}$ | $8 \times 10^{13}$ | $4 \times 10^{15}$ | $5 \times 10^{11}$ | $3 \times 10^{14}$ |
| Other appearance | ○ | ○ | Δ | Δ | x | Δ | ○ |

In the Table 6, the abbreviations are as follows.
A: ABS-V
B: Lactone-modified polyvinyl alcohol/LMPVA-1
E: Polycaprolactone
F: Polyvinyl alcohol
G: Polyethylene glycol
H: Polyethylene glycol/polypropylene glycol
I: Dodecylbenzene sodium sulfonate
L: Izod impact strength (kg-cm/cm)
M: Bending elasticity (kg/cm$^2$)
N: Tensile strength (kg/cm$^2$)
O: Surface resistivity at 1 hour after molded (ohm)
P: Surface resistivity at 30 days after molded (ohm)

EXAMPLES 23 AND 24

Same operations as in Example 19 were followed except that there were a polybutylene terephthalate resin [Duranex 500FP manufactured by Polyplastics, Ltd., hereinafter, referred to as PBT] and a polycarbonate resin [Yupilon S-3000 manufactured by Mitsubishi Gas Kagaku, Ltd., hereinafter, referred to as PC]. The results are shown in TABLE 7-continued

| Resin (parts by weight) | Example | | Comparative Example | |
|---|---|---|---|---|
| | 23 | 24 | 11 | 12 |
| F | | | 10 | 10 |
| Item | | | | |
| L | 3 | 15 | 2 | 5 |
| M | 24000 | 24000 | 24000 | 25000 |
| N | 650 | 680 | 670 | 700 |
| O | $4 \times 10^{12}$ | $2 \times 10^{12}$ | $8 \times 10^{12}$ | $1 \times 10^{13}$ |
| P | $3 \times 10^{13}$ | $2 \times 10^{12}$ | $3 \times 10^{12}$ | $5 \times 10^{12}$ |
| Other appearance | ○ | ○ | Δ | Δ |

In the Table 5, the abbreviations are as follows.
J: PBT
K: PC
B: Lactone-modified polyvinyl alcohol/LMPVA-1
F: Polyvinyl alcohol
L: Izod impact strength (kg-cm/cm)
M: Bending elasticity (kg/cm$^2$)
N: Tensile strength ( kg/cm$^2$)

O Surface resistivity at 1 hour after molded (ohm)

P: Surface resistivity at 30 days after molded (ohm) It is to be noted that resin compositions obtained in Examples 19 to 24 and Comparative Examples 4 to 12 were molded by an injection machine to carry out measurement of properties by testing methods as described below.

(1) Izod impact strength: It was measured according to ASTM D256.

(2) Bending elasticity: It was measured according to ASTM D790.

(3) Tensile Strength: It was measured according to ASTM D638.

(4) Surface resistivity value: It was measured with a color plate having the thickness of 3 mm, the width of 50 mm, the length of 90 mm at room temperature 23° C. and humidity of 50%RH using a super insulation meter SM-10E manufactured by Toa Denpa Kogyo, Ltd.

(5) surface outer appearance: Using the same molded pieces as described above, flow mark, unevenness of gloss, unevenness of colors, and a weld line were visually observed to evaluate according to the following standards.

o is good, Δ is slightly good, and X is poor.

In Examples 25 to 28 described below, analyses relating to products were carried out according to methods as described below.

(analytical method)

(1) Number average molecular weight

Equipment employed: Chromatopack C-R4A manufactured by Shimadzu Seisakusyo, Ltd.

Column employed: Shodex GPC KF-800P, KF-804, KF8025, KF-801 manufactured by Showa Denko, Ltd.

Measurement conditions: Solvent employed=THF, temperature=50° C.

In order to measure a molecular weight of products, a polystyrene in which its molecular weight is defined was employed for preparing a calibration curve, and then the data measured in relation to the products were calculated based on a universal correction method.

(2) the theoretical number of hydroxyl group per one molecule (piece)

(3) the theoretical mol number of hydroxyl group per 1 g of a resin (mol/g)

(4) the measured mol number of hydroxyl group per 1 g of a resin (mol/g)

(calculation of the mol number of hydroxyl group per 1 g of a resin)

$$HV = \frac{0.5 \times 10^{-3} \times (B - A) \times f}{S} + AV$$

In the above equation, the abbreviations are as follows.

S: Amount of a sample (g)

HV: Mol number of hydroxyl group per 1 g of a resin (mol/g)

A: Amount of a standard solution of sodium hydroxide having 0.5N to be employed in relation to samples (ml)

B: Amount of a standard solution of sodium hydroxide having 0.5N to be employed in a blank test (ml)

f: Factor of a standard solution of sodium hydroxide having 0.5N to be employed

AV: Mol number of acid per 1 g of a resin (mol/g)

Approximate 0.5 g of the respective lactone-modified polymers having high hydroxyl values, which were obtained in Examples 25 to 28, were precisely weighed, and respective 0.5 g was charged into an Erlenmeyer flask having a capacity of 200-ml equipped with ground stoppers, followed by charging precise 25 ml of a pyridine solution (42 g of phthalic anhydride/300 ml of pyridine) of phthalic anhydride with a hole pipet. Successively, an air-condenser was set, followed by heating for 1 hour while intermittently and slowly vibrating in a water bath maintained constantly at 98°±2° C.

It was placed until attaining to room temperatures after being taken out of the water bath, followed by washing materials adhered to the air condenser and internal wall of the flask with 10 ml of pyridine to recover in the Erlenmeyer flask equipped with ground stoppers.

Precise 50 ml of a standard sodium hydroxide solution having 0.5N was added with a hole pipet, which factor was in advance measured, followed by titrating with a standard sodium hydroxide solution having 0.5N using phenolphthalein as an indicator. Test was terminated at a point that a red color is maintained for 30 minutes. A blank test was carried out at the same conditions.

Also, acetone solutions of the respective lactone-modified polymers having high hydroxyl values obtained in Examples were titrated with the above-described standard sodium hydroxide solution having 0.5N to calculate an acid mol number (AV) per 1 g of resin and a hydroxyl group mol number (HV) per 1 g of resin.

EXAMPLE 25

A 1-liter glass-made flask was charged with 100 g of a polyvinyl alcohol [PVA-403 manufactured by Kuraray, Ltd., a saponification degree of 81.5±1.5 and a polymerization degree of 300], 900 g of epsilon-caprolactone, and 0.05 g of monobutyltin tris(2-ethylhexanate) which is a polymerization catalyst, followed by raising the inside temperature of the flask to 180° C. and kneading while melting for 3 hours to obtain a white-colored waxy product. Table 8 shows a number average molecular weight, theoretical hydroxyl group numbers per one molecule, and hydroxyl group mol numbers measured in Tests. It is to be noted that the average polymerization degree a of the vinyl acetate structural unit (corresponding to L) is 60, the average polymerization degree b corresponding to the vinyl alcohol structural unit into which epsilon-caprolactone is addition polymerized (an average polymerization degree of 6.1) is 170, and the average polymerization degree c corresponding to the vinyl alcohol structural unit is 70, which are the values calculated.

EXAMPLE 26

Same kneading while melting by the steps, temperatures, and time as described in Example 25 was followed except that a polyvinyl alcohol was changed to [PVA-117 manufactured by Kuraray, Ltd., a saponification degree of 98.5±0.5 and a polymerization degree of 1700].

A product obtained after kneaded while melting was a transparent liquid having a high viscosity. In relation to the product, the same analyses as in Example 25 were carried out to obtain the results shown in Table 8.

It is to be noted that the average polymerization degree a of vinyl acetate structural unit (corresponding to L) is 20, the average polymerization degree b corresponding to the vinyl alcohol structural unit into which epsilon-caprolactone is addition polymerized (an average polymerization degree of 5.0) is 1180, and the average polymerization degree c corresponding to the vinyl alcohol structural unit is 500, which are the values calculated.

EXAMPLE 27

A 1-liter glass-made flask was charged with 50 g of a styrene-2-hydroxyethylmethacrylate copolymer (molar ratio of 1:1 and a number average molecular weight of 7400), 950 g of epsilon-caprolactone, and 0.02 g of stannic chloride which is a polymerization catalyst, followed by raising the inside temperature of the flask to 160° C. and kneading while melting for 4 hours to obtain a white-colored crystal-like solid. In relation to the solid, the same analyses as in Example 1 were carried out to obtain the results shown in Table 8. It is to be noted that the average polymerization degree a of the styrene structural unit (corresponding to L) is 32, the average polymerization degree b corresponding to the 2-hydroxyethylmethacrylate structural unit into which epsilon-caprolactone is addition polymerized (an average polymerization degree of 38.5) is 32, and the average polymerization degree c corresponding to the 2-hydroxyethylmethacrylate vinyl alcohol structural unit is 0, which are the values calculated.

EXAMPLE 28

A 1-liter glass-made flask was charged with 20 g of a polyvinyl alcohol PVA-403 manufactured by Kuraray, Ltd. (a saponification degree of 81.5±0.5 and polymerization degree of 300), 700 g of epsilon-caprolactone, 280 g of 4-methylcaprolactone, and 0.05 g of monobutyltin tris(2-ethylhexanate) which is a polymerization catalyst, followed by raising the inside temperature of the flask to 180° C. and kneading while melting for 4 hours to obtain a product which is a viscous liquid. Table 8 shows a number average molecular weight, theoretical hydroxyl group numbers per one molecule, and hydroxyl group mol numbers measured in Tests. It is to be noted that the average polymerization degree a of vinyl acetate structural unit (corresponding to L) is 60, the average polymerization degree b corresponding to the vinyl alcohol structural unit into which epsilon-caprolactone is addition polymerized (an average polymerization degree of 27.0) is 230, and the average polymerization degree c corresponding to the vinyl alcohol structural unit is 10, which are the values calculated.

TABLE 8

| Analytical items | Example 25 | Example 26 | Example 27 | Example 28 |
|---|---|---|---|---|
| A | 158,000 | 650,000 | 173,000 | 514,000 |
| B | 240 | 1,680 | 32 | 240 |
| C | $1.5 \times 10^{-3}$ | $2.3 \times 10^{-3}$ | $2.4 \times 10^{-4}$ | $2.4 \times 10^{-4}$ |
| D | $1.2 \times 10^{-3}$ | $1.5 \times 10^{-3}$ | $2.6 \times 10^{-4}$ | $3.0 \times 10^{-4}$ |

In Table 8, the abbreviations are as follows.

A: Number average molecular weight

B: Number of hydroxyl groups per 1 g of a resin (the number)

C: Theoretical mol number of hydroxyl groups per 1 g of a resin (mol/g)

D: Measured mol number of hydroxyl groups per 1 g of a resin (mol/g)

From the Table 8, it is shown that the mol number of hydroxyl groups per 1 g of a resin, the number of hydroxyl groups per 1 g of a resin, and number average molecular weight in the products obtained in Examples 25 to 27 are included within the scope claimed in the present invention.

EXAMPLE 29

Quite same processes for the preparation as in Example 3 were followed except that the polyvinyl alcohol in Example 3 was changed to a polyvinyl alcohol PVA-103 manufactured by Kuraray, Ltd. (a saponification degree of 98.5±0.5 and a polymerization degree of 300) to obtain a lactone-modified polyvinyl alcohol. epsilon-caprolactone of 0.18% was remained in the lactone-modified polyvinyl alcohol obtained.

Although it was difficult to dissolve this in water, it was almost dissolved at 18th day after the 0.5 g was immersed in 100 ml of water at 20° C.

It was identified that x, y, z, and n values in General Formula (1) in relation to this are approximately 74, 0, 26, and 1.5, respectively.

EXAMPLE 30

Quite same processes for the preparation as in Example 3 were followed except that the polyvinyl alcohol in Example 3 was changed to a polyvinyl alcohol PVA-403 manufactured by Kuraray, Ltd. (a saponification degree of 80.0±1.5 and a polymerization degree of 300) to obtain a lactone-modified polyvinyl alcohol. epsilon-caprolactone of 0.15% was remained in the lactone-modified polyvinyl alcohol obtained.

Although it was difficult to dissolve this in water, it was almost dissolved at approximate 100th day after the 0.5 g was immersed in 100 ml of water at 20° C. It was identified that x, y, z, and n values in General Formula (1) in relation to this are approximately 61, 20, 19, and 2.4, respectively.

EXAMPLE 31

A 1-liter glass-made flask was charged with 600 g of a polyvinyl alcohol PVA-103 (a saponification degree of 98.5±1.5 and a polymerization degree of 300) manufactured by Kuraray, Ltd., 400 g of epsilon-caprolactone, 0.03 g of monobutyltin tris(2-ethylhexanate) as a polymerization catalyst, 0.03 g of Irganox 1010 [manufactured by Ciba-Geigy, AG], and 1 g of Adekastar PEG-24G [Asahi Denka Kogyo, Ltd.] which are anti-oxidants. The temperature was raised to 180° C. and kneading while melting was carried out at the temperature for 5 hours to obtain a lactone-modified polyvinyl alcohol containing the remained epsilon-caprolactone of 0.20%.

It was almost dissolved at approximate 10th day after the 0.5 g was immersed in 100 ml of water at 20° C.

Furthermore, a melt viscosity of the solid was 642 poise at 160° C. in the case when passing through the orifice having the diameter of 1 mm and length of 1 cm under a load of 10 kg/cm$^2$.

It was identified that x, y, z, and n values in General Formula (1) in relation to this are approximately 80, 0, 20, and 1.3, respectively.

EXAMPLE 32

Quite same processes for the preparation as in Example 1 were followed except that the polyvinyl alcohol in Example 1 was changed to a polyvinyl alcohol PVA-424H (a saponification degree of 80.0 and a polymerization degree of 2400) manufactured by Kuraray, Ltd. to obtain a lactone-modified polyvinyl alcohol. epsilon-caprolactone of 0.31% was remained in the lactone-modified polyvinyl alcohol obtained.

This was a finely crystalline solid and showed an average molecular weight based on a standard Polystyrene of 202,000 measured by GPC.

It was identified that x, y, z, and n values in General Formula (1) in relation to this are approximately 48, 20, 32, and 3.2, respectively.

EXAMPLE 33

Quite same processes for the preparation as in Example 1 were followed except that the polyvinyl alcohol in Example 1 was changed to a polyvinyl alcohol PVA-235 (a saponification degree of 88.0±1.5 and a polymerization degree of 3500) manufactured by Kuraray, Ltd. to obtain a lactone-modified polyvinyl alcohol. epsilon-caprolactone of 0.47% was remained in the lactone-modified polyvinyl alcohol obtained.

This was a finely crystalline solid and showed an average molecular weight based on a standard Polystyrene of 254,000 measured by GPC.

It was identified that x, y, z, and n values in General Formula (1) in relation to this are approximately 51, 12, 37, and 3.0, respectively.

What is claimed is:

1. A lactone-modified polyvinyl alcohol which comprises having the structure represented by General Formula (1) described below

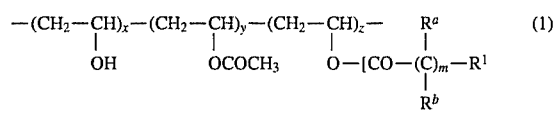

[wherein, x, y, and z are a composition by mol in the respective components, having a range of $0 \leq x \leq 95$, $0 \leq y \leq 30$, $5 \leq z \leq 100$, x+y+z is 100, respective components shown by x, y, and z are randomly connected, $R^a$ and $R^b$ are an independent hydrogen atom or a methyl group, m is a natural number ranging from 2 to 10, $R^1$ is a hydrogen atom or an acetyl group, n is an average number of a lactone monomer to be added, and a range of $1 \leq n \leq 100$].

2. A lactone-modified polyvinyl alcohol as set forth in claim 1, wherein said x, y, and z are $20 \leq x \leq 60$, $0 \leq y \leq 30$, $40 \leq z \leq 80$, x+y+z is 100, and n is $1 \leq n \leq 10$.

3. A lactone-modified polyvinyl alcohol as set forth in claim 1, wherein said x, y, and z are $60 \leq x \leq 95$, $0 \leq y \leq 30$, $5 \leq z \leq 40$, x+y+z is 100, and n is $1 \leq n \leq 3$.

4. A lactone-modified polyvinyl alcohol as set forth in claim 1, wherein said $R^a$ and $R^b$ are a hydrogen atom, respectively, and m is 5.

5. A process for the preparation of the lactone-modified polyvinyl alcohol as set forth in claim 1, which comprises kneading 5–95 parts by weight of a polyvinyl alcohol with 95–5 parts by weight of a lactone monomer (total of both is 100 parts by weight) and 0.001–0.1 parts by weight of a polymerization catalyst while melting at a temperature of 50°–250° C.

* * * * *